United States Patent
Zheng et al.

(10) Patent No.: US 11,588,701 B2
(45) Date of Patent: Feb. 21, 2023

(54) METHOD AND SYSTEM FOR DETERMINING NETWORK SLICE TOPOLOGY, AND DEVICE

(71) Applicant: Huawei Technologies Co., Ltd., Shenzhen (CN)

(72) Inventors: Juan Zheng, Nanjing (CN); Li Ren, Nanjing (CN); Xuanxuan Wang, Nanjing (CN); Ting Liao, Nanjiing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/334,227

(22) Filed: May 28, 2021

(65) Prior Publication Data
US 2021/0385134 A1    Dec. 9, 2021

(30) Foreign Application Priority Data

May 30, 2020   (CN) .......................... 202010480830.4
Aug. 19, 2020  (CN) .......................... 202010838832.6

(51) Int. Cl.
*H04L 29/08*     (2006.01)
*H04L 41/12*     (2022.01)
(Continued)

(52) U.S. Cl.
CPC .......... *H04L 41/12* (2013.01); *H04L 41/5003* (2013.01); *H04L 41/5025* (2013.01)

(58) Field of Classification Search
CPC ..................................................... H04L 41/12
See application file for complete search history.

(56) References Cited

U.S. PATENT DOCUMENTS 10,708,082 B1 *   7/2020 Bakiaraj ............... H04L 45/586
2012/0275311 A1  11/2012 Ivershen et al.
(Continued)

FOREIGN PATENT DOCUMENTS

CN     102820984 A     12/2012
CN     110661636 A      1/2020
(Continued)

OTHER PUBLICATIONS

IEEE Std 802.1ABTM-2016(Revision of IEEE Std 802.1AB-2009), "IEEE Standard for Local and metropolitan area networks—Station and Media Access Control Connectivity Discovery," Sponsor LAN/MAN Standards Committee of the IEEE Computer Society, Approved Jan. 29, 2016, 146 pages.
(Continued)

*Primary Examiner* — Adnan M Mirza
(74) *Attorney, Agent, or Firm* — Conley Rose, P.C.

(57) ABSTRACT

A method includes obtaining, by a management device, sub-interface information that includes a correspondence between an identifier of a first sub-interface of a first device and a first network slice identifier, a correspondence between an identifier of a second sub-interface of a second device and a second network slice identifier, and information indicating that the first sub-interface is directly connected to the second sub-interface, and determining, by the management device, a network slice topology based on the obtained sub-interface information.

31 Claims, 8 Drawing Sheets

(51) Int. Cl.
  *H04L 41/5025*   (2022.01)
  *H04L 41/5003*   (2022.01)

(56)   References Cited

U.S. PATENT DOCUMENTS

| | | |
|---|---|---|
| 2013/0010640 A1 | 1/2013 | Higuchi et al. |
| 2015/0043382 A1 | 2/2015 | Arora et al. |
| 2017/0111236 A1* | 4/2017 | Bielenberg ............ G06F 16/951 |
| 2019/0116097 A1 | 4/2019 | Shimojou et al. |
| 2019/0289647 A1 | 9/2019 | Li |
| 2021/0119879 A1 | 4/2021 | Zhang et al. |
| 2022/0158905 A1 | 5/2022 | Zhang et al. |

FOREIGN PATENT DOCUMENTS

| | | |
|---|---|---|
| EP | 3531634 A1 | 8/2019 |
| JP | 2013017021 A | 1/2013 |
| JP | 2016521529 A | 7/2016 |
| WO | 2015196923 A1 | 12/2015 |
| WO | 2017170937 A1 | 10/2017 |
| WO | 2018163259 A1 | 9/2018 |
| WO | 2020001044 A1 | 1/2020 |

OTHER PUBLICATIONS

Qiao Wei, "Application of SNMP Protocol in Automatic Discovery of Network Topology," 2014, 2 pages (abstract).

\* cited by examiner

| Destination MAC address | Source MAC address | VLAN field | Type | LLDP data unit | Frame check sequence |

FIG. 4

METHOD AND SYSTEM FOR DETERMINING NETWORK SLICE TOPOLOGY, AND DEVICE

CROSS-REFERENCE TO RELATED APPLICATION

This application claims priority to Chinese Patent Application No. 202010480830.4 filed on May 30, 2020 and Chinese Patent Application No. 202010838832.6 filed on Aug. 19, 2020, which are hereby incorporated by reference in their entireties.

TECHNICAL FIELD

This application relates to the communications field, and in particular, to a method and system for determining a network slice topology, and a device.

BACKGROUND

As service requirements and application scenarios are increasingly diversified, to meet differentiated requirements of different services in a same network, a concept of network slicing is proposed in the industry. A network slicing technology provides a capability of implementing differentiated service-level agreement (SLA) assurance for a plurality of services when network resources are limited. The network slicing technology is applied to fields such as a 5th generation (5G) technology and an enterprise private line, to provide sliced pipe assurance based on SLA requirements of services. However, there is no technical solution for collecting and presenting a sub-interface-based network slice topology.

SUMMARY

This application provides a method and system for determining a network slice topology, and a device, to implement customization and deployment of a sub-interface-based network slice topology, and ensure isolation between and differentiated requirements of a plurality of services.

According to a first aspect, a method for determining a network slice topology is provided. A management device obtains sub-interface information that includes a correspondence between an identifier of a first sub-interface of a first device and a first network slice identifier, a correspondence between an identifier of a second sub-interface of a second device and a second network slice identifier, and information indicating that the first sub-interface is directly connected to the second sub-interface. It should be understood that the sub-interface information includes the first network slice identifier to which the first sub-interface belongs, the second network slice identifier to which the second sub-interface belongs, and the information indicating that the first sub-interface is directly connected to the second sub-interface. The management device determines at least one network slice topology based on the obtained sub-interface information. According to the method, the management device determines, based on the sub-interface information, a network slice topology including a sub-interface, to implement customization of the network slice topology including the sub-interface, and ensure isolation between and differentiated requirements of a plurality of services.

In a possible implementation, when the first network slice identifier is the same as the second network slice identifier, it may be understood that the first sub-interface and the second sub-interface belong to a same network slice. Therefore, the at least one network slice topology determined by the management device based on the obtained sub-interface information is referred to as a first network slice topology. The first network slice topology includes the identifier of the first sub-interface, the identifier of the second sub-interface, and an identifier of a direct link between the first sub-interface and the second sub-interface. According to the method, the management device determines, based on correspondences between sub-interfaces and identifiers of network slices, that the first sub-interface and the second sub-interface belong to a same network slice, and therefore determines that the network slice topology includes the identifier of the first sub-interface, the identifier of the second sub-interface, the identifier of the direct link between the first sub-interface and the second sub-interface.

In a possible implementation, when the first network slice identifier is different from the second network slice identifier, it may be understood that the first sub-interface and the second sub-interface belong to different network slices. Therefore, the at least one network slice topology determined by the management device based on the obtained sub-interface information is two different network slice topologies, which are respectively referred to as a second network slice topology and a third network slice topology. The second network slice topology includes the identifier of the first sub-interface, and the third network slice topology includes the identifier of the second sub-interface. According to the method, the management device determines, based on correspondences between sub-interfaces and network slices, that the first sub-interface and the second sub-interface belong to different network slices, and therefore determines content of the two different network slice topologies.

In a possible implementation, the sub-interface information obtained by the management device further includes an identifier of the first device and an identifier of the second device. According to the method, the management device may further obtain an identifier of a device to which the sub-interface belongs, to determine a network slice topology including the identifier of the device.

In a possible implementation, when the first network slice identifier is the same as the second network slice identifier, it may be understood that the first sub-interface and the second sub-interface belong to a same network slice. Therefore, the at least one network slice topology determined by the management device is referred to as a fourth network slice topology. The fourth network slice topology includes the identifier of the first sub-interface, the identifier of the first device, the identifier of the second sub-interface, the identifier of the second device, and an identifier of a direct link between the first sub-interface and the second sub-interface. For example, the identifier of the direct link between the first sub-interface and the second sub-interface may be identified by the identifier of the first device and the identifier of the second device, or may be identified by the identifier of the first sub-interface and the identifier of the second sub-interface. According to the method, the management device determines, based on correspondences between sub-interfaces and network slices, that the first sub-interface and the second sub-interface belong to a same network slice, and therefore determines that the network slice topology includes the identifier of the first sub-interface, the identifier of the second sub-interface, the identifier of the first device, the identifier of the second device, and the identifier of the direct physical link between the first sub-interface and the second sub-interface.

In a possible implementation, when the first network slice identifier is different from the second network slice identifier, it may be understood that the first sub-interface and the second sub-interface belong to different network slices. Therefore, the at least one network slice topology determined by the management device is two different network slice topologies, which are respectively referred to as a fifth network slice topology and a sixth network slice topology. The fifth network slice topology includes the identifier of the first sub-interface and the identifier of the first device, and the sixth network slice topology includes the identifier of the second sub-interface and the identifier of the second device. According to the method, the management device determines, based on correspondences between sub-interfaces and network slices, that the first sub-interface and the second sub-interface belong to different network slices, and therefore determines content of the two different network slice topologies.

In a possible implementation, the management device obtains the sub-interface information through one or more of the Network Configuration Protocol (NETCONF), the Simple Network Management Protocol (SNMP), telemetry, the Border Gateway Protocol (BGP), and the Representational State Transfer Configuration Protocol (RESTCONF). For example, the management device obtains the sub-interface information from a received NETCONF packet, an SNMP packet, an in-situ flow information telemetry (iFIT) packet, a BGP-link state (BGP-LS) packet, or a RESTCONF packet. According to the method, a plurality of implementations in which the management device obtains the sub-interface information are provided.

In a possible implementation, the method further includes the management device receives a first packet sent by the first device. The first packet includes update information of the sub-interface information. The management device updates the at least one network slice topology based on the update information in the first packet. According to the method, the network slice topology is updated in real time.

In a possible implementation, the update information includes update information of the correspondence between the identifier of the second sub-interface of the second device and the second network slice identifier. In an example, the update information further includes update information of the second device.

In a possible implementation, the management device obtains the update information through the SNMP. It may be understood that the first packet carrying the update information is an SNMP trap message. SNMP trap is used by a network device to actively send an alarm notification to the management device when a specific event is detected. According to the method, the device actively notifies the management device of the update information, so that a network administrator can promptly handle a situation that occurs in a network.

In a possible implementation, the method further includes the management device determines, based on a correspondence between the first network slice identifier and an SLA parameter, that the first sub-interface is used to transmit a service flow based on the SLA parameter. According to the method, different SLA services are provided for different services based on network slicing, to meet diversified service requirements.

In a possible implementation, before the management device obtains the sub-interface information, the management device sends a second packet to the first device. The second packet is used to indicate the first device to send at least one piece of information in the sub-interface information to the management device. For example, the second packet sent by the management device to the first device is used to indicate the first device to send the correspondence between the identifier of the first sub-interface of the first device and the first network slice identifier to the management device, the correspondence between the identifier of the second sub-interface of the second device and the second network slice identifier, and the sub-interface information that includes the information indicating that the first sub-interface is directly connected to the second sub-interface. For example, the second packet may be a NETCONF packet, an SNMP packet, or a RESTCONF packet. According to the method, an implementation in which the management device obtains the sub-interface information is provided.

In a possible implementation, before the management device obtains the sub-interface information, the method further includes the management device receives a third packet sent by the first device, and obtains the correspondence between the identifier of the first sub-interface and the first network slice identifier and the correspondence between the identifier of the second sub-interface and the second network slice identifier from the third packet. The third packet includes the correspondence between the identifier of the first sub-interface and the first network slice identifier and the correspondence between the identifier of the second sub-interface and the second network slice identifier. For example, the third packet may be a NETCONF packet, an SNMP packet, or a RESTCONF packet. According to the method, an implementation in which the management device obtains the correspondence between the identifier of the first sub-interface and the first network slice identifier and the correspondence between the identifier of the second sub-interface and the second network slice identifier from the first device is provided.

In a possible implementation, before the management device obtains the sub-interface information, the method further includes the management device receives a fourth packet sent by the first device and a fifth packet sent by the second device. The management device obtains the correspondence between the identifier of the first sub-interface and the first network slice identifier from the fourth packet, and obtains the correspondence between the identifier of the second sub-interface and the second network slice identifier from the fifth packet. The fourth packet includes the correspondence between the identifier of the first sub-interface and the first network slice identifier, and the fifth packet includes the correspondence between the identifier of the second sub-interface and the second network slice identifier. According to the method, an implementation in which the management device obtains the correspondence between the identifier of the first sub-interface and the first network slice identifier from the first device, and obtains the correspondence between the identifier of the second sub-interface and the second network slice identifier from the second device is provided.

In a possible implementation, the sub-interface information further includes a correspondence between an identifier of a physical port to which the first sub-interface belongs and the first network slice identifier. It may be understood that the physical port and the first sub-interface are located in a same network slice, and therefore, the first network slice topology determined by the management device further includes the identifier of the physical port. According to the method, the network slice topology determined by the management device further includes the identifier of the physical port to which the first sub-interface belongs.

According to a second aspect, a method for determining a network slice topology is provided. A first device receives a first packet sent by a second device. The first packet includes an identifier of a second sub-interface of the second device. The first device sends sub-interface information to a management device. The sub-interface information includes the identifier of the second sub-interface, a correspondence between an identifier of a first sub-interface of the first device and a first network slice identifier, and information indicating that the first sub-interface is directly connected to the second sub-interface. According to the method, an implementation in which the first device obtains an identifier of a sub-interface of the second device is provided.

In a possible implementation, the first packet further includes a correspondence between the identifier of the second sub-interface and a second network slice, and the sub-interface information further includes the correspondence between the identifier of the second sub-interface and the second network slice. According to the method, an implementation in which the first device obtains a network slice to which the second sub-interface of the second device belongs is provided.

In a possible implementation, the method further includes before the first device sends the first packet to the management device, the first device receives a second packet sent by the management device. The second packet is used to indicate the first device to send at least one piece of information in the sub-interface information to the management device. For example, the second packet may be a NETCONF packet, an SNMP packet, or a RESTCONF packet. The second packet is used to indicate the first device to send the identifier of the second sub-interface and the identifier of the first sub-interface to the management device. Alternatively, the second packet is used to indicate the first device to send the correspondence between the identifier of the first sub-interface and the first network slice to the management device. Alternatively, the second packet is used to indicate the first device to send the correspondence between the identifier of the first sub-interface and the first network slice and the correspondence between the identifier of the second sub-interface and the second network slice to the management device. According to the method, the first device needs to send the sub-interface information to the management device as required. This provides an implementation in which the first device sends the sub-interface information to the management device.

In a possible implementation, the first device sends the sub-interface information to the management device through at least one of the NETCONF, the SNMP, the iFIT protocol, the BGP-LS protocol, and the RESTCONF. According to the method, an implementation in which the first device sends the sub-interface information to the management device is provided.

In a possible implementation, the first packet is a Link Layer Discovery Protocol (LLDP) packet, and a virtual local area network (VLAN) field added to the LLDP packet carries the identifier of the second sub-interface, for example, a VLAN identifier (ID). According to the method, the LLDP packet is extended, so that the first device obtains the identifier of the sub-interface of the second device when obtaining neighbor information of the second device through the LLDP packet.

In a possible implementation, the first packet is an LLDP packet, and an LLDP Data Unit (LLDPDU) of the LLDP packet carries the second network slice identifier corresponding to the identifier of the second sub-interface. For example, an optional type-length-value (TLV) in the LLDPDU is used to carry the second network slice identifier and indicate a mapping relationship between the second network slice identifier and the identifier of the second sub-interface. According to the method, the LLDPDU of the LLDP packet carries a network slice identifier to which the second sub-interface belongs, so that when obtaining the neighbor information of the second device through the LLDP packet, the first device obtains the network slice identifier to which the second sub-interface belongs.

In a possible implementation, the method further includes the first device sends a third packet to the management device. The third packet includes update information of the sub-interface information, and the update information is used by the management device to update a network slice topology determined by the management device. According to the method, the sub-interface information is updated in real time.

In a possible implementation, the update information includes update information of the correspondence between the identifier of the second sub-interface of the second device and the second network slice identifier. According to the method, the first device updates the neighbor information in real time, so that the management device updates the network slice topology in real time.

In a possible implementation, the third packet is an SNMP trap message. According to the method, the device actively notifies the management device of the update information, so that a network administrator can promptly handle a situation that occurs in a network.

In a possible implementation, the first device determines, based on a correspondence between the first network slice identifier and a first SLA parameter, that the first sub-interface is used to transmit a service flow based on the first SLA parameter. According to the method, different SLA services are provided for different services based on network slicing, to meet diversified service requirements.

According to a third aspect, a management device is provided, and is configured to perform the method in any one of the first aspect or the possible implementations of the first aspect. Specifically, the network device includes units configured to perform the method in any one of the first aspect or the possible implementations of the first aspect.

According to a fourth aspect, a first device is provided, and is configured to perform the method in any one of the second aspect or the possible implementations of the second aspect. Specifically, the first device includes units configured to perform the method in any one of the second aspect or the possible implementations of the second aspect.

According to a fifth aspect, a management device is provided. The management device includes a processor, a communications interface, and a memory. The memory may be configured to store program code. The processor is configured to invoke the program code in the memory to perform any one of the first aspect or the possible implementations of the first aspect. For details, refer to the detailed descriptions in the method example. Details are not described herein again.

According to a sixth aspect, a first device is provided. The first device includes a processor, a communications interface, and a memory. The memory may be configured to store program code. The processor is configured to invoke the program code in the memory to perform the method in any one of the second aspect or the possible implementations of the second aspect. For details, refer to the detailed descriptions in the method example. Details are not described herein again.

According to a seventh aspect, a system for determining a network slice topology is provided. The system includes a management device configured to perform the method in any one of the first aspect or the possible implementations of the first aspect and a first device configured to perform the method in any one of the second aspect or the possible implementations of the second aspect.

According to an eighth aspect, a system for determining a network slice topology is provided. The system includes a management device, a first device, and a second device. The first device is configured to receive an identifier, sent by the second device, of a second sub-interface of the second device, and send, to the management device, the identifier of the second sub-interface, a correspondence between an identifier of a first sub-interface of the first device and a first network slice identifier, and information indicating that the first sub-interface is directly connected to the second sub-interface. The second device is configured to send the identifier of the second sub-interface to the first device, and send a correspondence between the second sub-interface and a second network slice to the management device. The management device is configured to obtain the correspondence between the identifier of the first sub-interface and the first network slice identifier, the correspondence between the identifier of the second sub-interface and the second network slice, and the information indicating that the first sub-interface is directly connected to the second sub-interface, and determine at least one network slice topology based on the obtained sub-interface information.

According to a ninth aspect, a system for determining a network slice topology is provided. The system includes a management device, a first device, and a second device. The first device is configured to receive a correspondence, sent by the second device, between an identifier of a second sub-interface of the second device and a second network slice identifier, and send, to the management device, a correspondence between an identifier of a first sub-interface of the first device and a first network slice identifier, the correspondence between the identifier of the second sub-interface and the second network slice identifier, and information indicating that the first sub-interface is directly connected to the second sub-interface. The management device is configured to obtain the correspondence between the identifier of the first sub-interface and the first network slice identifier, the correspondence between the identifier of the second sub-interface and the second network slice, and the information indicating that the first sub-interface is directly connected to the second sub-interface, and determine at least one network slice topology based on the obtained information.

According to a tenth aspect, a computer-readable medium including instructions is provided. When the instructions are executed on a computer, the computer is enabled to perform the method in any one of the first aspect or the possible implementations of the first aspect, or perform the method in any one of the second aspect or the possible implementations of the second aspect.

According to an eleventh aspect, a computer program product including instructions is provided. When the computer program product runs on a computer, the computer performs the method in any one of the first aspect or the possible implementations of the first aspect, or performs the method in any one of the second aspect or the possible implementations of the second aspect.

BRIEF DESCRIPTION OF DRAWINGS

FIG. 4 is a schematic diagram of a format of an LLDP packet according to this application;

DESCRIPTION OF EMBODIMENTS

The following describes, with reference to the accompanying drawings, implementations of a method and system for determining a network slice topology and a device provided in this application.

Figure 1:
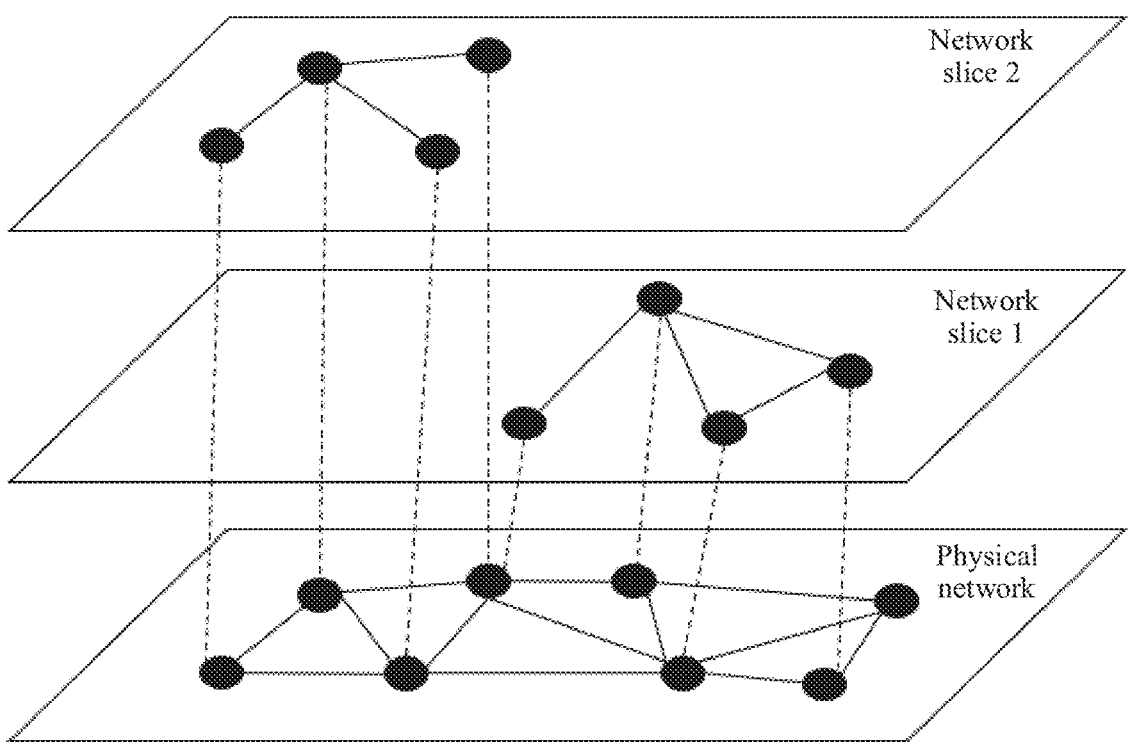
FIG. 1 is a schematic structural diagram of a network slice according to this application.

To meet differentiated requirements of 5G services and implement differentiated SLA assurance for a plurality of services, different service applications need to be isolated from each other. In this case, a network slice can provide a flexible and customizable multi-level differentiated service for a service as required. FIG. 1 is a schematic structural diagram of a network slice according to this application. Based on different requirements of different services for a quantity of users, quality of service (QoS), and bandwidth, networking is performed as required. A physical network in FIG. 1 is divided into a network slice 1 and a network slice 2. The network slice 1 and the network slice 2 share resources of the physical network. For example, the network slice 1 is used for a service that requires high bandwidth, and the network slice 2 is used for a service that requires a low delay. However, currently, there is no solution for collecting and presenting a network slice topology that is based on a sub-interface of a network device. Consequently, a network slice constructed based on the sub-interface cannot be used to implement differentiated assurance for a service.

In view of the foregoing technical problem, this application proposes a method and a system for determining a network slice topology, and a device. In the method, a management device obtains a correspondence between an identifier of a sub-interface of at least one device and a network slice, and a connection relationship between sub-interfaces, to determine a network slice topology including a sub-interface. In this method, the sub-interface-based network slice topology is collected and presented, and differentiated assurance is implemented for a service by using a network slice constructed based on the sub-interface. The following describes an implementation of determining a network slice topology by using two embodiments.

Embodiment 1

Figure 2:
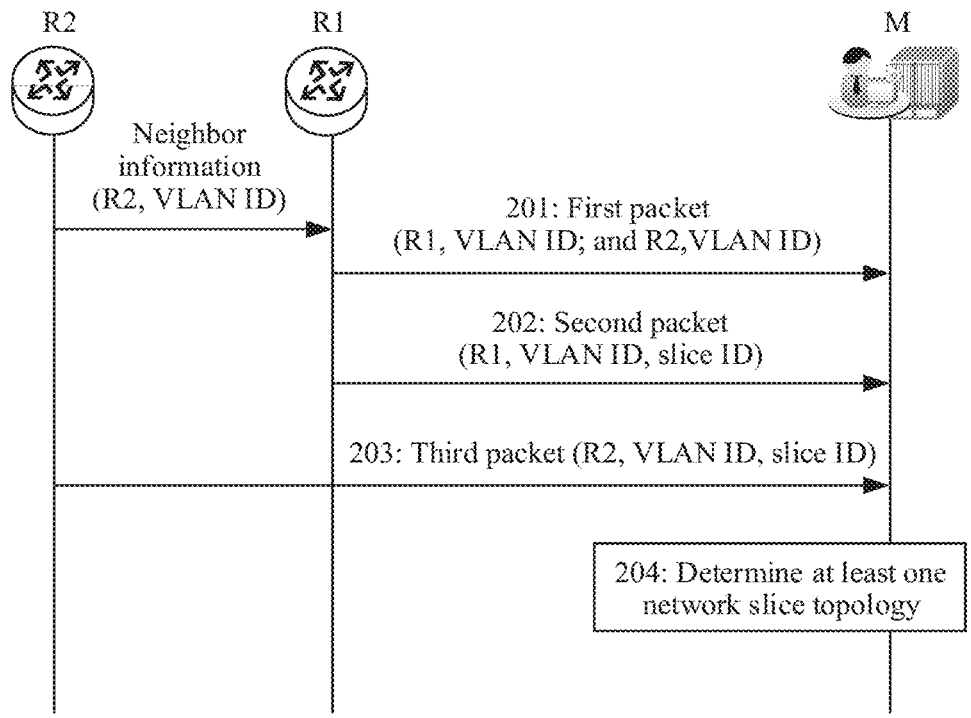
FIG. 2 is a schematic flowchart of a method for determining a network slice topology according to this application.

FIG. 2 is a schematic flowchart of a method for determining a network slice topology according to this application. A device M in FIG. 2 may be a network management device, for example, a device that runs a management system such as an enterprise management system (EMS) or a network management system (NMS), or may be a control device that performs centralized control on a network device. The device M is configured to manage or control R1 and R2. R1 is a first device, and R2 is a second device. The method includes the following steps.

Step 201: A management device receives a first packet from the first device.

The management device communicates with the first device through the NETCONF, RESTCONF, SNMP, BGP, or telemetry. The RESTCONF is used to transmit, based on the Hypertext Transfer Protocol (HTTP), Yet Another Next Generation (YANG) data configured using a data storage concept defined in the NETCONF. In an implementation, the first packet is a NETCONF packet, a RESTCONF packet, an SNMP packet, a BGP-LS packet, or an iFIT packet based on a telemetry technology.

The management device obtains, through the foregoing protocol packet, an identifier of a first sub-interface of the first device, an identifier of a second sub-interface of the second device, and information indicating that the first sub-interface is directly connected to the second sub-interface. It may be understood that the first packet carries the identifier of the first sub-interface of the first device, the identifier of the second sub-interface of the second device, and the information indicating that the first sub-interface is directly connected to the second sub-interface. It should be noted that, creation of the first sub-interface and the second sub-interface may be based on a device Ethernet port, a bound port, or a VLAN. For example, a sub-interface obtained through division performed based on the VLAN may also be referred to as a logical interface or a sub-port. This means that one or more sub-interfaces are created at a primary port (which may also be referred to as a primary interface or a port) of the network device. The primary port may be a physical port (for example, a layer 3 Ethernet interface) or a logical interface. Sub-interfaces are logically independent of each other. Different VLAN IDs are configured to identify different sub-interfaces. Sub-interfaces are configured with link-layer and network-layer parameters based on physical-layer parameters of the primary port. The VLAN refers to a communications technology in which a physical LAN is logically divided into a plurality of broadcast domains, to isolate packets in different VLANs during transmission. In addition, a direct connection state between the first sub-interface and the second sub-interface refers to a state in which a packet is sent from the first sub-interface to the second sub-interface without processing by another network device other than a relay device or a transparent transmission device.

In an example, before the management device receives the first packet sent by the first device, the management device sends an indication packet to the first device. The indication packet is used to indicate the second device to send, to the management device, the identifier of the first sub-interface of the first device and the identifier of the second sub-interface of the second device.

Figure 3:
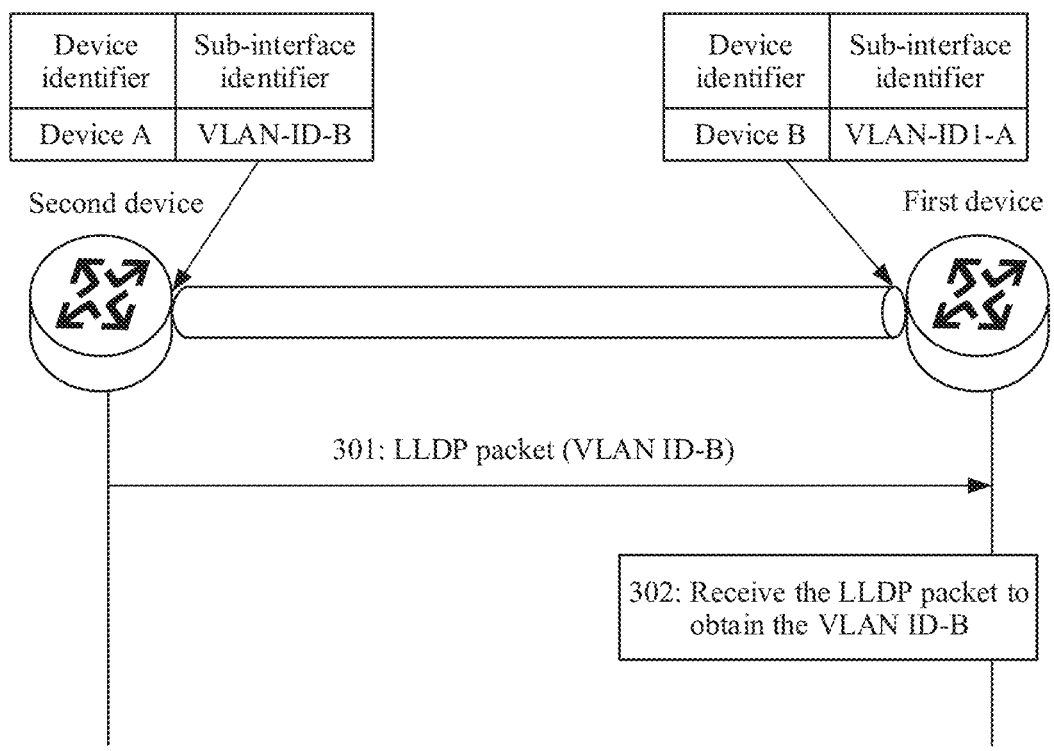
FIG. 3 is a schematic flowchart of a method for obtaining neighbor information according to this application.

In an example, the identifier of the first sub-interface and the identifier of the second sub-interface are obtained from information stored in the first device. For example, the first device receives, through a primary port A to which the first sub-interface belongs, neighbor information sent by a primary port B to which the second sub-interface of the second device belongs. The neighbor information carries identifiers of one or more sub-interfaces obtained through division performed at the primary port B. The first device obtains, based on the neighbor information, the identifier of the sub-interface that is at the primary port B and that is of the second device. The first device stores the identifier of the sub-interface that is at the primary port B and that is of the second device and the identifier of the sub-interface that is at the primary port A and that is of the first device. It should be understood that the neighbor information implements communication between neighboring devices. The first device further obtains, based on the neighbor information, the information indicating that there is a direct link between the first sub-interface and the second sub-interface. The first device and the second device are neighboring devices. FIG. 3 is a schematic flowchart of a method for obtaining neighbor information according to this application. The method includes the following steps.

301: The second device sends the neighbor information to the first device.

The second device sends the neighbor information to the first device through the LLDP or the Link Automatic Discovery (LAD) protocol. A protocol used by the second device to send the neighbor information is not limited to the two protocols in the foregoing example, and the second device may alternatively send the neighbor information to the first device through another protocol describing the neighbor information.

The following uses the LLDP as an example to describe a process in which the second device sends the neighbor information to the first device. The LLDP is a layer 2 discovery protocol defined by the Institute of Electrical and Electronics Engineers (IEEE) 802.1ab. The LLDP provides a link-layer discovery manner in which status information such as main capabilities, management addresses, device identifiers, and interface identifiers of a local device and a neighboring device is encapsulated into an LLDP packet and sent to the neighboring device. After receiving the status information, the neighboring device stores the status information in a form of a standard management information base (MIB), so that the control device, the management device, or an NMS queries the MIB and determines a communication status of a link. In an implementation, the second device generates an LLDP packet based on one or more identifiers that are stored in a local MIB and that are of sub-interfaces (for example, the second sub-interface) at the primary port, of the local device, and based on one or more identifiers that are stored in a remote MIB and that are of sub-interfaces (for example, the first sub-interface) at the primary port, of the neighboring device, and sends the LLDP to the first device.

In an example, a VLAN field is added to the LLDP packet, and the VLAN field is used to identify the identifier of the sub-interface. For example, a VLAN field is added between a source media access control (MAC) address field and a type field, and is used to carry the identifier of the sub-interface. The identifier of the sub-interface may be a VLAN ID. FIG. 4 is a schematic diagram of a format of an LLDP packet according to this application. The LLDP packet includes a destination MAC address, a source MAC address, a type, an LLDPDU, and a frame check sequence (FCS). For example, the destination MAC address is 0x0180-C200-000E, the source MAC address is a MAC address of a slicing interface or a MAC address of a device bridge (if there is an interface address, an interface MAC address is used as the source MAC address), and the type is 0x88CC. The LLDPDU is a data unit encapsulated in the LLDP packet and is used to carry the neighbor information for exchange. In an implementation, primary ports through which the first device and the second device exchange LLDP packets each enable a VLAN mode by using a command line.

In an example, a manner in which the second device sends the LLDP packet shown in FIG. 4 to the first device includes periodically sending, by the second device, the LLDP packet to the first device, or sending the LLDP packet to the first device when information stored in the local MIB changes, or sending the LLDP packet to the first device at an initial configuration stage.

302: The first device receives the neighbor information sent by the second device.

The first device receives, through the LLDP, the LAD, or another protocol, the neighbor information sent by the second device. For example, the first device receives the LLDP packet that carries the neighbor information, and stores, in the remote MIB of the first device, the identifier that is of the sub-interface (for example, the second sub-interface) of the second device and that is learned from the LLDP packet. It should be understood that the first device learns, based on the neighbor information in the LLDP packet, the identifier of the first sub-interface, the identifier of the second sub-interface, and the information indicating that there is a direct link between the first sub-interface and the second sub-interface. The link is used for communication between the first device and the second device, and the link includes a cable or an optical fiber.

The following describes, by using examples, an implementation in which the management device obtains sub-interface information.

Manner 1: The first packet received by the management device from the first device includes neighboring status information of the first device, for example, includes the identifier of the sub-interface (for example, the identifier of the first sub-interface), the identifier of the sub-interface (for example, the identifier of the second sub-interface) of the second device, and the information indicating that the first sub-interface is directly connected to the second sub-interface. In the neighbor information shown in the following Table 1-1, the first device is a receive end, and the second device is a transmit end. If a third device is also a neighboring device of the first device, the information sent by the first device to the management device further includes neighbor information that the first device serves as a receive end and the third device serves as a transmit end, and the management device obtains an identifier of another sub-interface (an identifier of a third sub-interface) of the first device, and an identifier of a sub-interface (an identifier of a fourth sub-interface) of the third device. Table 1-2 shows the neighbor information. In an implementation, the first device encapsulates neighbor information about more than two neighbors into the first packet, and sends the first packet to the management device. In another implementation, the first device encapsulates two pieces of neighbor information into different packets, and separately sends the different packets to the management device. It should be understood that the management device learns or obtains the following information from the neighbor information: the first device and the second device are neighboring devices, the first device and the third device are neighboring devices, the identifier of the first sub-interface of the first device is a VLAN ID-A, the identifier of the second sub-interface of the second device is a VLAN ID-B, there is a direct physical link between the VLAN ID-A and the VLAN ID-B, and there is a direct physical link between a VLAN ID-C and a VLAN ID-D.

TABLE 1-1

| Receive end/Transmit end | Field | Description |
|---|---|---|
| First device | VLAN ID-A | The VLAN ID-A represents the identifier of the first sub-interface. If a link is an aggregated link, the field is a VLAN ID of the aggregated link. Otherwise, the field is a VLAN ID corresponding to the primary port. |
| Second device | VLAN ID-B | The VLAN ID-B represents the identifier of the second sub-interface. If a link is an aggregated link, the field is a VLAN ID of the aggregated link. Otherwise, the field is a VLAN ID corresponding to the primary port. |

TABLE 1-2

| Receive end/Transmit end | Field | Description |
|---|---|---|
| First device | VLAN ID-C | The VLAN ID-C represents the identifier of the third sub-interface. If a link is an aggregated link, the field is a VLAN ID of the aggregated link. Otherwise, the field is a VLAN ID corresponding to the primary port. |
| Third device | VLAN ID-D | The VLAN ID-D represents the identifier of the fourth sub-interface. If a link is an aggregated link, the field is a VLAN ID of the aggregated link. Otherwise, the field is a VLAN ID corresponding to the primary port. |

Manner 2: The first packet received by the management device from the first device includes neighboring status information of the first device, for example, includes the identifier of the sub-interface (for example, the identifier of the first sub-interface), the identifier of the sub-interface (for example, the identifier of the second sub-interface) of the second device, the information indicating that the first sub-interface is directly connected to the second sub-interface, an identifier of the first device, and an identifier of the second device. Table 2-1 shows the neighbor information. If a third device is also a neighboring device of the first device, the neighbor information sent by the first device to the management device further includes neighbor information that the first device serves as a receive end and the third device serves as a transmit end. The neighbor information includes the identifier of the sub-interface (for example, an identifier of a third sub-interface) of the first device, an identifier of a sub-interface (for example, an identifier of a fourth sub-interface) of the third device, an identifier of the first device, and an identifier of the third device. Table 2-2 shows the neighbor information. It should be understood that the management device learns the following information based on the neighbor information shown in the following Table 2-1 and Table 2-2: the first device and the second device are neighboring devices, the first device and the third device are neighboring devices, the identifier of the first device is a device A, the identifier of the second device is a device B, the identifier of the third device is a device D, there is a direct physical link between a VLAN ID-A and a VLAN ID-B, there is a direct physical link between a VLAN ID-C and a VLAN ID-D, the identifier of the first sub-interface of the first device is the VLAN ID-A, the identifier of the second sub-interface of the second device is the VLAN ID-B, the identifier of the third sub-interface of the first device is the VLAN ID-C, and the identifier of the fourth sub-interface of the third device is the VLAN ID-D.

TABLE 2-1

| Receive end/Transmit end | Field | Description |
|---|---|---|
| First device | Chassis ID-Device A | The identifier of the first device is the device A. |
| | VLAN ID-A | The VLAN ID-A represents the identifier of the first sub-interface. If a link is an aggregated link, the field is a VLAN ID of the aggregated link. Otherwise, the field is a VLAN ID corresponding to the primary port. |
| Second device | Chassis ID-Device B | The identifier of the second device is the device B. |
| | VLAN ID-B | The VLAN ID-B represents the identifier of the second sub-interface. If a link is an aggregated link, the field is a VLAN ID of the aggregated link. Otherwise, the field is a VLAN ID corresponding to the primary port. |

TABLE 2-2

| Receive end/Transmit end | Field | Description |
|---|---|---|
| First device | Chassis ID-Device A | The identifier of the first device is the device A. |
| | VLAN ID-C | The VLAN ID-C represents the identifier of the third sub-interface. If a link is an aggregated link, the field is a VLAN ID of the aggregated link. Otherwise, the field is a VLAN ID corresponding to the primary port. |
| Third device | Chassis ID-Device D | The identifier of the third device is the device D. |
| | VLAN ID-D | The VLAN ID-D represents the identifier of the fourth sub-interface. If a link is an aggregated link, the field is a VLAN ID of the aggregated link. Otherwise, the field is a VLAN ID corresponding to the primary port. |

Manner 3: The first packet received by the management device from the first device includes neighboring status information of the first device, for example, includes the identifier of the sub-interface (for example, the identifier of the first sub-interface) of the first device, the identifier of the sub-interface (for example, the identifier of the second sub-interface) of the second device, an identifier of a primary port (for example, referred to as an identifier of a first port) to which the sub-interface of the first device belongs, and an identifier of a primary port (for example, referred to as an identifier of a second port) to which the sub-interface of the second device belongs. Table 3-1 shows the neighbor information. If the third device is also a neighboring device of the first device, the neighbor information sent by the first device to the management device further includes neighbor information that the first device serves as a receive end and the third device serves as a transmit end. The neighbor information includes an identifier of another sub-interface (for example, an identifier of a third sub-interface) of the first device, an identifier of a sub-interface (for example, an identifier of a fourth sub-interface) of the third device, an identifier of a primary port (for example, referred to as an identifier of a third port) to which the sub-interface of the first device belongs, and an identifier of a primary port (for example, referred to as an identifier of a fourth port) to which the sub-interface of the third device belongs. Table 3-2 shows the neighbor information. It should be understood that, the management device may learn or obtain the following information based on the received neighbor information, as shown in Table 3-1 and Table 3-2, sent by the first device: the first device and the second device are neighboring devices, the first device and the third device are neighboring devices, the identifier of the first port is a port ID-A, the identifier of the second port is a port ID-B, the identifier of the third port is a port ID-C, the identifier of the fourth port is a port ID-D, there is a direct physical link between the port IDA and the port ID-B, there is a direct physical link between the port ID-C and the port ID-D, there is a direct physical link between a VLAN ID-A and a VLAN ID-B, there is a direct physical link between a VLAN ID-C and a VLAN ID-D, the sub-interface VLAN ID-A is obtained through division performed at the port ID-A, the sub-interface VLAN ID-B is obtained through division performed at the port ID-B, the sub-interface VLAN ID-C is obtained through division performed at the port ID-C, the sub-interface VLAN ID-D is obtained through division performed at the port ID-D, the identifier of the first sub-interface of the first device is the VLAN ID-A, the identifier of the second sub-interface of the second device is the VLAN ID-B, the identifier of the third sub-interface of the first device is the VLAN ID-C, and the identifier of the fourth sub-interface of the third device is the VLAN ID-D.

TABLE 3-1

| Receive end/Transmit end | Field | Description |
|---|---|---|
| First device | Port ID-A | Identifier of a port at which the neighbor information sent by the second device is received and that is on the first device |
| | VLAN ID-A | The VLAN ID-A represents an identifier of the sub-interface at the port ID-A. If a link is an aggregated link, the field is a VLAN ID of the aggregated link. Otherwise, the field is a VLAN ID corresponding to the primary port |
| Second device | Port ID-B | Identifier of a port at which the neighbor information is sent to the first device and that is on the second device |
| | VLAN ID-B | The VLAN ID-B represents an identifier of the sub-interface at the port ID-B. If a link is an aggregated link, the field is a VLAN ID of the aggregated link. Otherwise, the field is a VLAN ID corresponding to the primary port. |

TABLE 3-2

| Receive end/Transmit end | Field | Description |
|---|---|---|
| First device | Port ID-C | Identifier of a port at which the neighbor information sent by the second device is received and that is on the first device |
| | VLAN ID-C | The VLAN ID-C represents an identifier of the sub-interface at the port ID-C. If a link is an aggregated link, the field is a VLAN ID of the aggregated link. Otherwise, the field is a VLAN ID corresponding to the primary port. |
| Third device | Port ID-D | Identifier of a port at which the neighbor information is sent to the first device and that is on the third device |
| | VLAN ID-D | The VLAN ID-D represents an identifier of the sub-interface at the port ID-D. If a link is an aggregated link, the field is a VLAN ID of the aggregated link. Otherwise, the field is a VLAN ID corresponding to the primary port. |

Manner 4: The first packet received by the management device from the first device includes neighboring status information of the first device, for example, includes the identifier of the sub-interface (for example, the identifier of the first sub-interface) of the first device, the identifier of the sub-interface (for example, the identifier of the second sub-interface) of the second device, an identifier of a primary port (for example, referred to as an identifier of a first port) to which the sub-interface of the first device belongs, an identifier of a primary port (for example, referred to as an identifier of a second port) to which the sub-interface of the second device belongs, an identifier of the first device, and an identifier of the second device. Table 4-1 shows the neighbor information. If the third device is also a neighboring device of the first device, the neighbor information sent by the first device to the management device further includes neighbor information that the first device serves as a receive end and the third device serves as a transmit end. The neighbor information includes the identifier of the sub-interface (for example, an identifier of a third sub-interface) of the first device, an identifier of a sub-interface (for example, an identifier of a fourth sub-interface) of the third device, an identifier of a primary port (for example, referred to as an identifier of a third port) to which the sub-interface of the first device belongs, an identifier of a primary port (for example, referred to as a fourth port) to which the sub-interface of the third device belongs, the identifier of the first device, and an identifier of the third device. Table 4-2 shows the neighbor information. It should be understood that, the management device may obtain the following information based on the received neighbor information, as shown in Table 4-1 and Table 4-2, sent by the first device: the first device and the second device are neighboring devices, the first device and the third device are neighboring devices, the identifier of the first port is a port ID-A, the identifier of the second port is a port ID-B, the identifier of the third port is a port ID-C, the identifier of the fourth port is a port ID-D, there is a direct physical link between the port ID-A and the port ID-B, there is a direct physical link between the port IDC and the port ID-D, there is a direct physical link between a VLAN ID-A and a VLAN ID-B, there is a direct physical link between a VLAN ID-C and a VLAN ID-D, the sub-interface VLAN ID-A is obtained through division performed at the port ID-A, the sub-interface VLAN ID-B is obtained through division performed at the port ID-B, the sub-interface VLAN ID-C is obtained through division performed at the port ID-C, the sub-interface VLAN ID-D is obtained through division performed at the port ID-D, the identifier of the first sub-interface of the first device is the VLAN ID-A, the identifier of the second sub-interface of the second device is the VLAN ID-B, the identifier of the third sub-interface of the first device is the VLAN ID-C, the identifier of the fourth sub-interface of the third device is the VLAN ID-D, the identifier of the first device is a device A, the identifier of the second device is a device B, and the identifier of the third device is a device D.

TABLE 4-1

| Receive end/Transmit end | Field | Description |
| --- | --- | --- |
| First device | Chassis ID-Device A | Identifier of the first device |
| | Port ID-A | Identifier of a port at which the neighbor information sent by the second device is received |
| | VLAN ID-A | The VLAN ID-A represents an identifier of the sub-interface at the port ID-A. If a link is an aggregated link, the field is a VLAN ID of the aggregated link. Otherwise, the field is a VLAN ID corresponding to the primary port. |
| Second device | Chassis ID-Device B | Identifier of the second device |
| | Port ID-B | Identifier of a port at which the neighbor information is sent to the first device |
| | VLAN ID-B | The VLAN ID-B represents an identifier of the sub-interface at the port ID-B. If a link is an aggregated link, the field is a VLAN ID of the aggregated link. Otherwise, the field is a VLAN ID corresponding to the primary port. |

TABLE 4-2

| Receive end/Transmit end | Field | Description |
| --- | --- | --- |
| First device | Chassis ID-Device A | Identifier of the first device |
| | Port ID-C | Identifier of a port at which the neighbor information sent by the second device is received |
| | VLAN ID-C | The VLAN ID-C represents an identifier of the sub-interface at the port ID-C. If a link is an aggregated link, the field is a VLAN ID of the aggregated link. Otherwise, the field is a VLAN ID corresponding to the primary port. |
| Third device | Chassis ID-Device D | Identifier of the third device |
| | Port ID-D | Identifier of a port at which the neighbor information is sent to the first device |
| | VLAN ID-D | The VLAN ID-D represents an identifier of the sub-interface at the port ID-D. If a link is an aggregated link, the field is a VLAN ID of the aggregated link. Otherwise, the field is a VLAN ID corresponding to the primary port. |

In an example, before the management device receives the first packet sent by the first device, the management device indicates, through the indication packet, the first device to send the first packet to the management device. The indication packet is a NETCONF packet, a RESTCONF packet, an SNMP packet, a BGP-LS packet, or an iFIT packet.

Step 202: The management device receives a second packet from the first device.

The management device communicates with the first device through a NETCONF, RESTCONF, SNMP, BGP, or telemetry technology. In other words, the second packet is a NETCONF packet, a RESTCONF packet, an SNMP packet, a BGP-LS packet, or an iFIT packet. The second packet carries a correspondence between the identifier of the first sub-interface of the first device and a first network slice identifier. Network slicing refers to flexible allocation of network resources, that is, virtualizes a network into a plurality of logical subnets that have different features and are isolated with each other. A network slice instance includes a set of network functions and required physical/virtual resources, for example, includes an access network, a core network, a transport network, a bearer network, and an application. For example, a virtualization technology is used to virtualize topology resources such as a link, a node, and a port of a network, obtain a plurality of logical virtual subnets through division in a hardware facility, and construct a virtual subnet layer at a physical network layer. A virtual network constructed by network slices has an independent management plane, control plane, and forwarding plane. Each virtual network can independently support various services, thereby implementing isolation between different services. The network slice may also be referred to as a network slice.

For example, as shown in Table 5-1, the second packet carries the correspondence between the identifier of the first sub-interface of the first device and the first network slice identifier.

TABLE 5-1

| Field | Description |
| --- | --- |
| VLAN ID-A | The VLAN ID-A represents the identifier of the first sub-interface. If a link is an aggregated link, the field is a VLAN ID of the aggregated link. Otherwise, the field is a VLAN ID corresponding to the primary port. |
| Slice ID-A | First network slice identifier, namely, a network slice identifier to which the first sub-interface belongs |

In an example, the second packet may further carry a correspondence between an identifier of a primary port (for example, referred to as the first port) to which the first sub-interface belongs and a network slice identifier. The first port and the first sub-interface may belong to a same network slice. In other words, a network slice identifier corresponding to the first port is the same as the network slice identifier corresponding to the first sub-interface. Alternatively, the first port and the first sub-interface may be located in different network slices. In other words, a network slice identifier corresponding to the first port is different from the network slice identifier corresponding to the first sub-interface.

In an example, before the management device receives the second packet sent by the first device, the management device sends the indication packet to the first device. The indication packet is used to indicate the first device to send the correspondence between the identifier of the first sub-interface of the first device and the first network slice identifier to the management device.

Step 203: The management device receives a third packet from the second device.

The management device communicates with the second device through the NETCONF, RESTCONF, SNMP, BGP, or telemetry technology. In other words, the third packet is a NETCONF packet, a RESTCONF packet, an SNMP packet, a BGP-LS packet, or an iFIT packet. The third packet carries a correspondence between the identifier of the second sub-interface of the second device and the first network slice identifier.

For example, as shown in Table 6-1, the third packet carries a correspondence between the identifier of the second sub-interface of the second device and a second network slice identifier.

TABLE 6-1

| Field | Description |
| --- | --- |
| VLAN ID-B | The VLAN ID-B represents the identifier of the second sub-interface. If a link is an aggregated link, the field is a |

TABLE 6-1-continued

| Field | Description |
| --- | --- |
| | VLAN ID of the aggregated link. Otherwise, the field is a VLAN ID corresponding to the primary port. |
| Slice ID-B | Second network slice identifier, namely, a network slice identifier to which the second sub-interface belongs |

In an example, the third packet may further carry a correspondence between an identifier of a primary port (for example, referred to as the second port) to which the second sub-interface belongs and a network slice identifier. The second port and the second sub-interface may belong to a same network slice. In other words, a network slice identifier corresponding to the second port is the same as the network slice identifier corresponding to the second sub-interface. Alternatively, the second port and the second sub-interface may be located in different network slices. In other words, a network slice identifier corresponding to the second port is different from the network slice identifier corresponding to the second sub-interface.

In an example, before the management device receives the third packet sent by the second device, the management device sends the indication packet to the second device. The indication packet is used to indicate the second device to send the correspondence between the identifier of the second sub-interface of the second device and the second network slice identifier to the management device.

Step 204: The management device determines at least one network slice topology.

The management device determines the network slice topology based on information obtained from the first packet, the second packet, and the third packet. For example, the management device obtains, from the first packet, the second packet, and the third packet, the correspondence between the identifier of the first sub-interface of the first device and the first network slice identifier, the correspondence between the identifier of the second sub-interface of the second device and the second network slice identifier, and the information indicating that the first sub-interface is directly connected to the second sub-interface, and determines the at least one network slice topology based on the obtained information.

The following describes, by using examples, an implementation in which the management device determines the network slice topology.

Manner 1: It is assumed that the neighbor information obtained by the management device is the neighbor information shown in Table 1-1. In a case, as shown in Table 7-1, the first network slice identifier and the second network slice identifier are the same and both are slice A. The management device determines, based on the information obtained by the management device in steps 201 to 203, that a first network slice topology includes the identifier of the first sub-interface and the identifier of the second sub-interface that are corresponding to the slice A, and an identifier of the direct link between the first sub-interface and the second sub-interface. The identifier of the link may further be identified as "first device-second device". In another case, as shown in Table 7-2, the first network slice identifier and the second network slice identifier are a slice A and a slice B respectively. It may be understood that a first network slice is different from a second network slice, and the first sub-interface and the second sub-interface belong to different network slices. The management device determines a second network slice topology and a third network slice topology based on the information obtained by the management device in steps 201 to 203. An identifier of the second network slice topology is the first network slice identifier slice A, and an identifier of the third network slice topology is the second network slice identifier slice B. The second network slice topology includes the identifier of the first sub-interface, and the third network slice topology includes the identifier of the second sub-interface.

TABLE 7-1

Content of the first network slice topology

| Network slice identifier | Identifier of the first sub-interface | Identifier of the second sub-interface | Identifier of a link between the first port and the second port |
|---|---|---|---|
| Slice A | VLAN ID-A | VLAN ID-B | VLAN ID-A—VLAN ID-B |

TABLE 7-2

Content of the second network slice topology

| Network slice identifier | Identifier of the first sub-interface |
|---|---|
| Slice A | VLAN ID-A |

Content of the third network slice topology

| Network slice identifier | Identifier of the second sub-interface |
|---|---|
| Slice B | VLAN ID-B |

Manner 2: It is assumed that the neighbor information obtained by the management device is the neighbor information included in Table 2-1. In a case, as shown in Table 8-1, the first network slice identifier is the same as the second network slice identifier and is a slice A. The management device determines, based on the information obtained in steps 201 to 203, that a fourth network slice topology includes the identifier of the first device, the identifier of the second device, the identifier of the first sub-interface, and the identifier of the second sub-interface that are corresponding to the slice A, and an identifier of the direct link between the first sub-interface and the second sub-interface. The identifier of the link may further be identified as "first device-second device". In another case, as shown in Table 8-2, the first network slice identifier and the second network slice identifier are a slice A and a slice B respectively. It may be understood that a first network slice is different from a second network slice, and the first sub-interface and the second sub-interface belong to different network slices. The management device determines a fifth network slice topology and a sixth network slice topology based on the information obtained in steps 201 to 203. An identifier of the fifth network slice topology is the first network slice identifier slice A, and an identifier of the sixth network slice topology is the second network slice identifier slice B. The fifth network slice topology includes the identifier of the first sub-interface, and the sixth network slice topology includes the identifier of the second sub-interface.

TABLE 8-1

Content of the fourth network slice topology

| Network slice identifier | Identifier of the first device | Identifier of the first sub-interface | Identifier of the second device | Identifier of the second sub-interface | Identifier of the direct link between the first sub-interface and the second sub-interface |
|---|---|---|---|---|---|
| Slice A | Device A | VLAN ID-A | Device B | VLAN ID-B | Port ID-A—Port ID-B |

TABLE 8-2

Content of the fifth network slice topology

| Network slice identifier | Identifier of the first device | Identifier of the first sub-interface |
|---|---|---|
| Slice A | Device A | VLAN ID-A |

Content of the sixth network slice topology

| Network slice identifier | Identifier of the second device | Identifier of the second sub-interface |
|---|---|---|
| Slice B | Device B | VLAN ID-B |

Manner 3: It is assumed that the neighbor information obtained by the management device is the neighbor information included in Table 3-1. In a case, as shown in Table 9-1, the first network slice identifier is the same as the second network slice identifier and is a slice A. The management device determines, based on the information obtained in steps 201 to 203, that a seventh network slice topology includes the identifier of the first sub-interface, and the identifier of the second sub-interface that are corresponding to the slice A, and an identifier of the direct link between the first sub-interface and the second sub-interface. The link identifier may further be identified as "first device-second device". In this case, if a network slice identifier corresponding to either of a port (for example, referred to as the first port) to which the first sub-interface belongs and a port (for example, referred to as the second port) to which the second sub-interface belongs is a slice A, the seventh network topology may further include the identifier of the first port and the identifier of the second port. In another case, as shown in Table 9-2, the first network slice identifier and the second network slice identifier are a slice A and a slice B respectively. It may be understood that a first network slice is different from a second network slice, and the first sub-interface and the second sub-interface belong to different network slices. The management device determines an eighth network slice topology and a ninth network slice topology based on the information obtained in steps 201 to 203. An identifier of the eighth network slice topology is the first network slice identifier slice A, and an identifier of the ninth network slice topology is the second network slice identifier slice B. The eighth network slice topology includes the identifier of the first sub-interface, and the ninth network slice topology includes the identifier of the second sub-interface. In this case, if every network slice identifier corresponding to the port (for example, referred to as the first port) to which the first sub-interface belongs is the slice A, and every network slice identifier corresponding to the port (for example, referred to as the second port) to which the second sub-interface belongs is the slice B, the eighth network topology may further include the identifier of the first port, and the ninth network topology may further include the identifier of the second port.

TABLE 9-1

Content of the seventh network slice topology

| Network slice identifier | Identifier of the first port | Identifier of the first sub-interface | Identifier of the second | Identifier of the second sub-interface | Identifier of the link between the first port and the second port |
|---|---|---|---|---|---|
| Slice A | Port ID-A | VLAN ID-A | Port ID-B | VLAN ID-B | Port ID-A—Port ID-B |

TABLE 9-2

Content of the eighth network slice topology

| Network slice identifier | Identifier of the port to which the first sub-interface belongs | Identifier of the first sub-interface |
|---|---|---|
| Slice A | Port ID-A | VLAN ID-A |

Content of the ninth network slice topology

| Network slice identifier | Identifier of the port to which the second sub-interface belongs | Identifier of the first sub-interface |
|---|---|---|
| Slice B | Port ID-B | VLAN ID-B |

Manner 4: It is assumed that the neighbor information obtained by the management device is the neighbor information included in Table 4-1. In a case, as shown in Table 10-1, the first network slice identifier is the same as the second network slice identifier and is a slice A. The management device determines, based on the information obtained in steps 201 to 203, that a tenth network slice topology includes the identifier of the first device, the identifier of the second device, the identifier of the first sub-interface, and the identifier of the second sub-interface that are corresponding to the slice A, and an identifier of the direct link between the first sub-interface and the second sub-interface. The identifier of the link may further be identified as "first device-second device". In this case, if a network slice identifier corresponding to either of a port (for example, referred to as the first port) to which the first sub-interface belongs and a port (for example, referred to as the second port) to which the second sub-interface belongs is a slice A, the tenth network topology may further include the identifier of the first port and the identifier of the second port. In another case, as shown in Table 10-2, the first network slice identifier and the second network slice identifier are a slice A and a slice B respectively. It may be understood that a first network slice is different from a second network slice, and the first sub-interface and the second sub-interface belong to different network slices. The management device determines an eleventh network slice topology and a twelfth network slice topology based on the information obtained in steps 201 to 203. An identifier of the eleventh network slice topology is the first network slice identifier slice A, and an identifier of the twelfth network slice topology is the second network slice identifier slice B. The eleventh network slice topology includes the identifier of the first sub-interface and the identifier of the first device, and the twelfth network slice topology includes the identifier of the second sub-interface and the identifier of the second device. In this case, if every network slice identifier corresponding to the port (for example, referred to as the first port) to which the first sub-interface belongs is the slice A, and every network slice identifier corresponding to the port (for example, referred to as the second port) to which the second sub-interface belongs is the slice B, the eleventh network topology may further include the identifier of the first port, and the twelfth network topology may further include the identifier of the second port.

TABLE 10-1

Content of the tenth network slice topology

| Network slice identifier | Identifier of the first port | Identifier of the first sub-interface | Identifier of the first device | Identifier of the second port | Identifier of the second sub-interface | Identifier of the second device | Identifier of the link between the first port and the second port |
|---|---|---|---|---|---|---|---|
| Slice A | Port ID-A | VLAN ID-A | Device A | Port ID-B | VLAN ID-B | Device B | Port ID-A—Port ID-B |

TABLE 10-2

Content of the eleventh network slice topology

| Network slice identifier | Identifier of the port to which the first sub-interface belongs | Identifier of the first sub-interface | Identifier of the first device |
|---|---|---|---|
| Slice A | Port ID-A | VLAN ID-A | Device A |

Content of the twelfth network slice topology

| Network slice identifier | Identifier of the port to which the interface belongs | Identifier of the first sub-second sub- | Identifier of the first interface device |
|---|---|---|---|
| Slice B | Port ID-B | VLAN ID-B | Device B |

In an example, the first device determines, based on a correspondence between the first network slice identifier and an SLA parameter, that the first sub-interface is used to transmit a data flow based on the SLA parameter. Further, the SLA parameter includes one or more of parameters such as first preset bandwidth, a first quantity of users, and a first preset delay. Different requirements for network conditions are imposed in different scenarios. Therefore, different SLA services are provided for different services based on network slicing to meet diversified business requirements.

In an example, the management device may further receive update information sent by the first device, and update the network slice topology based on the received update information. A manner in which the management device receives the update information includes: (1) The management device actively obtains the update information from the first device by continuously polling the first device; (2) The first device actively reports the update information to the management device based on the detected update information or based on a specified periodicity. For example, SNMP trap is used by the first device to actively send an alarm notification to the management device when a specific event is detected. The alarm notification carries more detailed information. A trap message is sent to the management device to notify the update information. In this way, a network administrator can promptly handle a situation that occurs in a network.

In an example, the update information includes a change of a correspondence between a sub-interface of a neighboring device (for example, the second sub-interface of the second device) and a network slice identifier to which the sub-interface belongs, or a change of the neighboring device (for example, the second device). For example, the first device reports the update information to the management device through the SNMP trap. The management device receives the update information and updates the network slice topology based on content of the network slice topology.

For example, the update information carried in a trap packet sent by the first device to the management device includes update information of the neighboring device. If the first device detects that a new neighboring device (for example, a fourth device) is added, the first device sends obtained neighbor information of the fourth device to the management device, so that the management device updates the network slice topology based on the update information.

Embodiment 2

Figure 5:
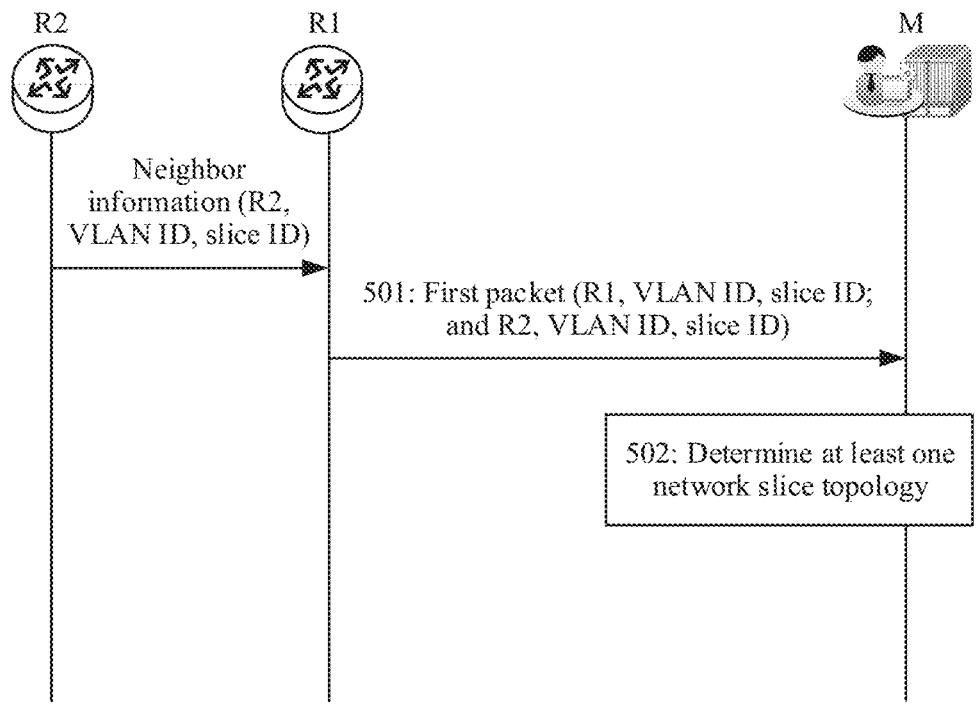
FIG. 5 is a schematic flowchart of another method for determining a network slice topology according to this application.

FIG. 5 is a schematic flowchart of another method for determining a network slice topology according to this application. A device M may be a network management device, for example, a device that runs a management system such as an EMS or an NMS, or may be a control device that performs centralized control on a network device, and is configured to manage or control a device R1 and a device R2. R1 is a first device, and R2 is a second device. The method includes the following steps.

501: The management device receives a first packet sent by the first device.

The first packet includes sub-interface information. The sub-interface information includes a correspondence between an identifier of a first sub-interface and a first network slice identifier, a correspondence between an identifier of a second sub-interface and a second network slice identifier, and information indicating that the first sub-interface is directly connected to the second sub-interface. In an implementation, the first packet is a NETCONF packet, a RESTCONF packet, an SNMP packet, a border BGP-LS packet, or an iFIT packet. The management device obtains the sub-interface information from the first packet. For a manner in which the management device receives the sub-interface information sent by the first device, refer to the related descriptions in FIG. 2. Details are not described herein again.

For example, the first packet that is received by the management device from the first device includes neighbor information shown in the following Table 11-1. The management device obtains or learns the following information from the first packet: there is a correspondence between a VLAN ID-A and a slice A that are of the first device, there is a correspondence between a VLAN ID-A and a slice A that are B of the second device, and there is a direct link between the VLAN ID-A and the VLAN ID-B.

TABLE 11-1

| Receive end/ Transmit end | Field | Description |
|---|---|---|
| First device | Slice A | The slice A represents the first network slice identifier corresponding to the identifier of the first sub-interface, and may also be understood as an identifier of a network slice to which the first sub-interface belongs. |
| | VLAN ID-A | The VLAN ID-A represents the identifier of the first sub-interface. If a link is an aggregated link, the field is a VLAN ID of the aggregated link. Otherwise, the field is a VLAN ID corresponding to the primary port. |
| Second device | Slice A | The slice A represents the second network slice identifier corresponding to the identifier of the second sub-interface, and may also be understood as an identifier of a network slice to which the second sub-interface belongs. |
| | VLAN ID-B | The VLAN ID-B represents the identifier of the first sub-interface. If a link is an aggregated link, the field is a VLAN ID of the aggregated link. Otherwise, the field is a VLAN ID corresponding to the primary port. |

In an example, before the management device receives the first packet sent by the first device, the management device sends an indication packet to the first device. The indication packet is used to indicate the first device to send the sub-interface information to the management device.

Figure 6:
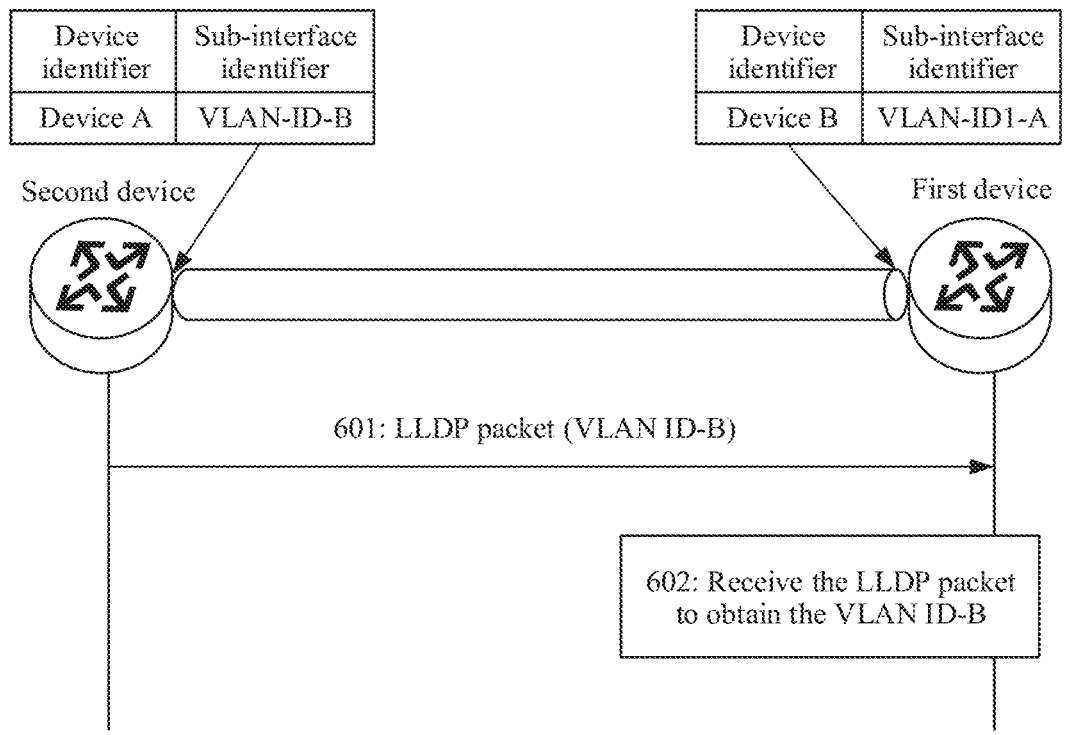
FIG. 6 is a schematic flowchart of a method for obtaining slice information according to this application.

In an example, before the first device sends the first packet to the management device, the first device obtains the correspondence between the identifier of the second sub-interface and the second network slice identifier from the second device. FIG. 6 is a schematic flowchart of a method for obtaining slice information according to this application. The method includes the following steps.

601: The second device sends slice information to the first device.

The second device sends the neighbor information to the first device through a protocol such as the LLDP or the LAD protocol. A protocol used by the second device to send the slice information is not limited to the two protocols in the foregoing example, and the first device may alternatively carry the slice information through another protocol.

Figure 7:
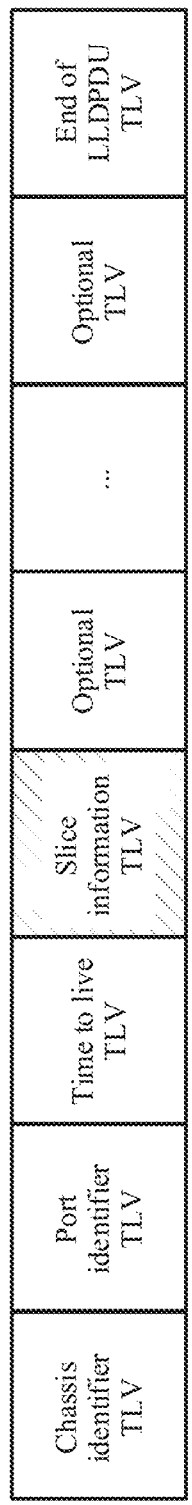
FIG. 7 is a schematic diagram of a format of an LLDPDU in an LLDP packet according to this application.

The following uses the LLDP as an example to describe a process in which the second device sends the neighbor information to the first device. An LLDP packet sent by the second device carries the correspondence between the identifier of the second sub-interface of the second device and the second network slice identifier. As shown in FIG. 4, a VLAN field may be added to the LLDP packet to carry the identifier of the sub-interface of the second device. In addition, FIG. 7 is a schematic diagram of a format of an LLDPDU in an LLDP packet according to this application. The LLDPDU includes a plurality of TLV. Specifically, the plurality of TLVs include a chassis identifier (Chassis ID) TLV, a port identifier (Port ID) TLV, a time to live TLV, an optional TLV, and an end of LLDPDU TLV. In the LLDPDU, the end of LLDPDU TLV identifies an end of the LLDP packet, the chassis identifier TLV identifies a bridge MAC address of a device that sends the LLDPDU, the port identifier TLV identifies a port of a transmit end that sends the LLDPDU, and the time to live TLV identifies survival time of device information on a neighboring node. The four types of TLVs are basic TLVs in the LLDPDU. The LLDPDU includes a plurality of optional TLVs. In an implementation, at least one optional TLV may be used to carry network slice information. The network slice information includes a correspondence between an identifier of a sub-interface (for example, the identifier of the second sub-interface) of the second device and an identifier of a network slice. It may be understood that the network slice information includes the identifier of the network slice to which the second sub-interface belongs. As shown in FIG. 7, the LLDPDU includes a network slice information TLV, and the network slice information TLV includes a type field, a length field, and a value field. The type field indicates that the network slice information TLV is used to carry the network slice information. The length field is used to indicate a length of content of the network slice information TLV. The value field is used to carry content of the network slice information. The network slice information TLV further indicates a mapping relationship between an identifier of a sub-interface in the VLAN field that is newly added to the LLDP packet and a network slice identifier, for example, a mapping relationship between the identifier of the second sub-interface carried in the VLAN field and a corresponding second network slice identifier.

FIG. 7 is an example diagram of a format of an LLDPDU packet. The network slice information TLV includes a network slice identifier, and the network slice identifier is used to identify a network slice. For example, if the first network slice identifier is the slice A, the first network slice identifier is used to indicate a network slice A. According to the extended VLAN field in the LLDP packet shown in FIG. 4, the VLAN field carries the identifier of the sub-interface of the second device. After receiving the LLDP packet sent by the second device, the first network device may determine, based on the VLAN field and the network slice information TLV in the first LLDP packet, that the second network slice identifier indicates the identifier (for example, the slice A) of the network slice to which the second sub-interface of the second device belongs.

602: The first device receives the slice information sent by the second device.

The first device receives, through the LLDP, the LAD, or another protocol, the network slice information sent by the second device. For example, the first device receives the LLDP packet that carries the neighbor information, and stores, in a MIB of the first device, the correspondence that is learned from the LLDP packet and that is between the identifier of the second sub-interface of the second device and the second network slice identifier.

502: The management device determines at least one network slice topology.

The management device determines the at least one network slice topology based on information obtained from the first packet. In an implementation, the first packet may further include an identifier of the first device and an identifier of the second device, or include an identifier of a primary port to which the first sub-interface belongs, and an identifier of a primary port to which the second sub-interface belongs. For details of a method for determining by the management device based on the information obtained from the first packet, refer to the four manners described in step 204 in FIG. 2. Details are not described herein again.

In an example, the management device may further receive update information sent by the first device, and update the network slice topology based on the received update information. A manner in which the management device receives the update information includes: (1) The management device actively obtains the update information from the first device by continuously polling the first device; (2) The first device actively reports the update information to the management device based on the detected update information or based on a specified periodicity. For example, SNMP trap is used by the first device to actively send an alarm notification to the management device when a specific event is detected. The alarm notification carries more detailed information. A trap message is sent to the management device to notify the update information. In this way, a network administrator can promptly handle a situation that occurs in a network.

In an example, the update information includes a change of a correspondence between a sub-interface of a neighboring device (for example, the second sub-interface of the second device) and a network slice identifier to which the sub-interface belongs, or a change of the neighboring device (for example, the second device). For example, the first device reports the update information to the management device through the SNMP trap. The management device receives the update information and updates the network slice topology based on content of the network slice topology.

Figure 8:
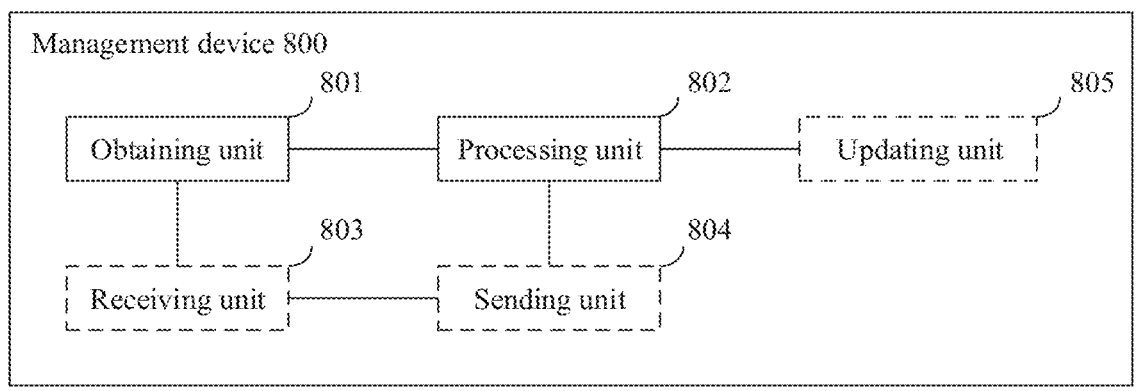
FIG. 8 is a schematic structural diagram of a management device according to this application.

FIG. 8 is a schematic structural diagram of a management device 800 according to an embodiment of this application. The management device 800 shown in FIG. 8 may perform corresponding steps performed by the management device in the methods in the foregoing embodiments. For example, the management device 800 may perform the method steps performed by the management device in steps 201 to 204 in FIG. 2. Alternatively, the management device 800 is capable of performing the method steps performed by the management device in step 501 and step 502 in FIG. 5. The management device is deployed in a communications network, where the communications network further includes a first device. As shown in FIG. 8, the management device 800 includes an obtaining unit 801 and a processing unit 802.

The obtaining unit 801 is configured to obtain sub-interface information, where the sub-interface information includes a correspondence between an identifier of a first sub-interface of the first device and a first network slice identifier, a correspondence between an identifier of a second sub-interface of a second device and a second network slice identifier, and information indicating that the first sub-interface is directly connected to the second sub-interface.

The processing unit 802 is configured to determine at least one network slice topology based on the sub-interface information.

Optionally, if the first network slice identifier is the same as the second network slice identifier, the at least one network slice topology determined by the management device includes the first network slice topology. The first network slice topology includes the identifier of the first sub-interface, the identifier of the second sub-interface, and an identifier of a direct link between the first sub-interface and the second sub-interface.

Optionally, if the first network slice identifier is different from the second network slice identifier, the at least one network slice topology determined by the management device includes a second network slice topology and a third network slice topology. The second network slice topology includes the identifier of the first sub-interface, and the third network slice topology includes the identifier of the second sub-interface.

Optionally, the sub-interface information further includes an identifier of the first device and an identifier of the second device.

Optionally, if the first network slice identifier is the same as the second network slice identifier, the at least one network slice topology determined by the management device includes a fourth network slice topology. The fourth network slice topology includes the identifier of the first sub-interface, the identifier of the first device, the identifier of the second sub-interface, the identifier of the second device, and an identifier of a direct link between the first sub-interface and the second sub-interface.

Optionally, if the first network slice identifier is different from the second network slice identifier, the at least one network slice topology determined by the management device includes a fifth network slice topology and a sixth network slice topology. The fifth network slice topology includes the identifier of the first sub-interface and the identifier of the first device, and the sixth network slice topology includes the identifier of the second sub-interface and the identifier of the second device.

Optionally, the management device may further include a sending unit 804. The sending unit 804 is configured to before the management device receives the sub-interface information sent by the first device, send a first packet to the first device, where the first packet is used to indicate the first device to send at least one piece of information in the sub-interface information to the management device.

Optionally, the management device may further include a receiving unit 803 and an updating unit 805. The receiving unit 803 is configured to receive a second packet sent by the first device, where the second packet includes update information of the sub-interface information. The updating unit 805 is configured to update, based on the update information in the second packet, the at least one network slice topology determined by the management device.

Optionally, the update information includes update information of the second device or update information of the correspondence between the identifier of the second sub-interface and the second network slice identifier.

Optionally, the processing unit 802 is further configured to determine, based on a correspondence between the first network slice identifier and an SLA parameter, that the first sub-interface is used to transmit a service flow based on the SLA parameter.

Optionally, the obtaining unit 801 is specifically configured to obtain the correspondence between the identifier of the first sub-interface and the first network slice identifier and the correspondence between the identifier of the second sub-interface and the second network slice identifier from a fourth packet that is received by the receiving unit 803 from the first device. The fourth packet includes the correspondence between the identifier of the first sub-interface and the first network slice identifier and the correspondence between the identifier of the second sub-interface and the second network slice identifier.

Optionally, the obtaining unit 801 is specifically configured to obtain the correspondence between the identifier of the first sub-interface and the first network slice identifier and the correspondence between the identifier of the second sub-interface and the second network slice identifier from a fifth packet sent by the first device and a sixth packet sent by the second device that are received by the receiving unit 803. The fifth packet includes the correspondence between the identifier of the first sub-interface and the first network slice identifier, and the sixth packet includes the correspondence between the identifier of the second sub-interface and the second network slice identifier.

Optionally, the sub-interface information further includes a correspondence between an identifier of a physical port to which the first sub-interface belongs and the first network slice identifier, and the first network slice topology further includes the identifier of the physical port.

Figure 9:
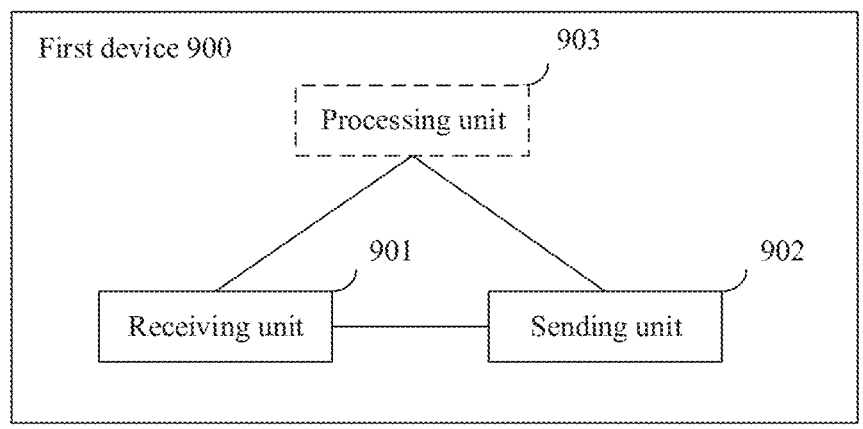
FIG. 9 is a schematic structural diagram of a first device according to this application.

FIG. 9 is a schematic structural diagram of a first device 900 according to an embodiment of this application. The first device 900 shown in FIG. 9 may perform corresponding steps performed by the first device in the methods in the foregoing embodiments. For example, the first device 900 may perform method steps performed by the first device in steps 201 and 202 in FIG. 2, and method steps performed by the first device in steps 301 and 302 in FIG. 3, method steps performed by the first device in step 501 in FIG. 5, or method steps performed by the first device in steps 601 and 602 in FIG. 6. The first device is deployed in a communications network, where the communications network further includes a management device. As shown in FIG. 9, the first device 900 includes a receiving unit 901 and a sending unit 902.

The receiving unit 901 is configured to receive a first packet sent by a second device, where the first packet includes an identifier of a second sub-interface of the second device.

The sending unit 902 is configured to send sub-interface information to the management device. The sub-interface information includes the identifier of the second sub-interface, a correspondence between an identifier of a first sub-interface of the first device and a first network slice identifier, and information indicating that the first sub-interface is directly connected to the second sub-interface.

Optionally, the first packet further includes a correspondence between the identifier of the second sub-interface and a second network slice, and the sub-interface information further includes the correspondence between the identifier of the second sub-interface and the second network slice.

Optionally, the receiving unit 901 is configured to before sending the first packet to the management device, receive a second packet sent by the management device, includes the second packet is used to indicate the first device to send at least one piece of information in the sub-interface information to the management device.

Optionally, the first packet is an LLDP packet, and a VLAN field added to the LLDP packet carries the identifier of the second sub-interface, for example, carries a VLAN ID.

Optionally, the first packet is an LLDP packet, and an LLDPDU of the LLDP packet carries a second network slice identifier corresponding to the identifier of the second sub-interface.

Optionally, the sending unit 902 is configured to send a third packet to the management device, where the third packet includes update information of the sub-interface information.

Optionally, the update information includes update information of the correspondence between the identifier of the second sub-interface and the second network slice identifier. The update information may further include update information of the second device, for example, deletion of the second device or a change of an interface of the second device.

Optionally, the first device may further include a processing unit 903. The processing unit 903 is configured to determine, based on a correspondence between the first network slice identifier and an SLA parameter, that the first sub-interface is used to transmit a data flow based on the SLA parameter.

Figure 10:
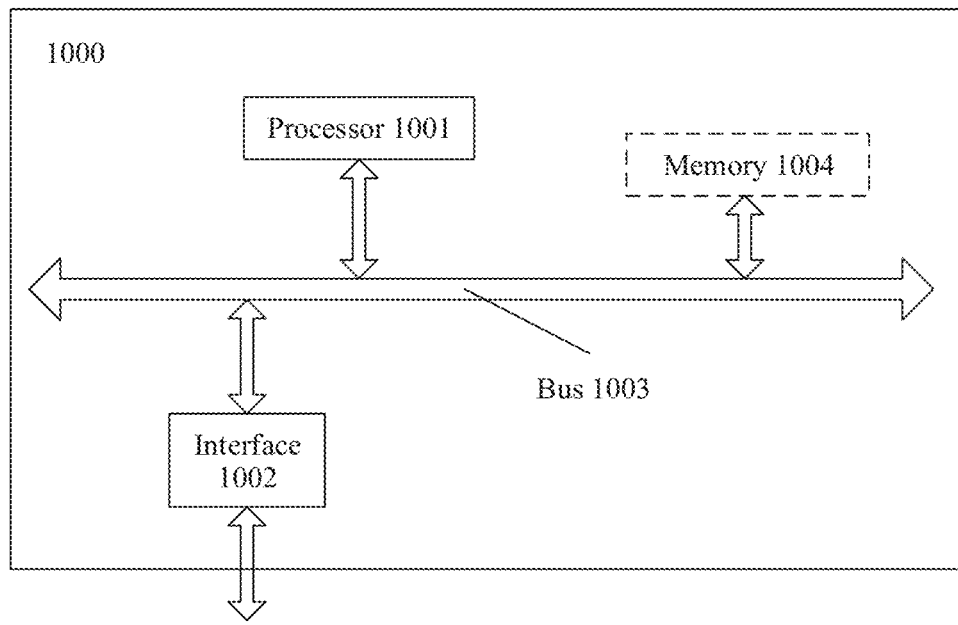
FIG. 10 is a schematic diagram of a hardware structure of another management device according to this application.

FIG. 10 is a schematic diagram of a hardware structure of a management device 1000 according to an embodiment of this application. The management device 1000 shown in FIG. 10 may perform corresponding steps performed by the management device in the methods in the foregoing embodiments. As shown in FIG. 10, the management device 1000 includes a processor 1001, an interface 1002, and a bus 1003. The processor 1001 is connected to the interface 1002 through the bus 1003.

In an example, the interface 1002 includes a transmitter and a receiver, and is used by the management device to receive a packet from or send a packet to the first device in the foregoing embodiments or the second device in the foregoing embodiments. For example, the interface 1003 is configured to support steps 201 to 203 in FIG. 2 and step 501 in FIG. 5. The processor 1001 is configured to perform processing performed by the management device in the foregoing embodiments, and/or is configured to perform another process of the technology described in this specification. For example, the processor 1001 is configured to obtain sub-interface information, and determine at least one network slice topology based on the sub-interface information. For example, the processor 1001 is configured to support step 204 in FIG. 2 and step 502 in FIG. 5.

In an example, the management device 1000 may further include a memory 1004. The memory 1004 may be configured to store a program, code, or an instruction. When executing the program, the code, or the instruction, the processor or a hardware device may complete a processing processes related to the management device in the method embodiments. Optionally, the memory 1004 may include a read-only memory (ROM) and a random-access memory (RAM). The ROM includes a basic input/output system (BIOS) or an embedded system, and the RAM includes an application and an operating system. When the management device 1000 needs to run, a bootloader in the BIOS or the embedded system that is embedded into the ROM is used to boot a system to start, and boot the management device 1000 to enter a normal running state. After entering the normal running state, the management device 1000 runs the application program and the action system in the RAM, to complete the processing processes related to the management device in the method embodiments. It may be understood that, FIG. 10 shows only a simplified design of the management device 1000. In actual application, the management device may include any quantity of interfaces, processors, or memories.

It should be understood that the processor may be a central processing unit (CPU), or may be another general purpose processor, a digital signal processor (DSP), an application-specific integrated circuit (ASIC), a field-programmable gate array (FPGA) or another programmable logic device, a discrete gate or transistor logic device, a discrete hardware component, or the like. The general purpose processor may be a microprocessor, any conventional processor, or the like. It should be noted that the processor may be a processor that supports an advanced reduced instruction set computing machine (ARM) architecture.

Further, in an optional embodiment, the memory may include a ROM and a RAM, and provide an instruction and data to the processor. The memory may further include a non-volatile RAM. For example, the memory may further store information about a device type.

The memory may be a volatile memory or a non-volatile memory, or may include both a volatile memory and a non-volatile memory. The non-volatile memory may be a ROM, a programmable ROM (PROM), an erasable PROM (EPROM), an electrically EPROM (EEPROM), or a flash memory. The volatile memory may be a RAM, and is used as an external cache. For example but not limitation, many forms of RAMs are available, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM.

Figure 11:
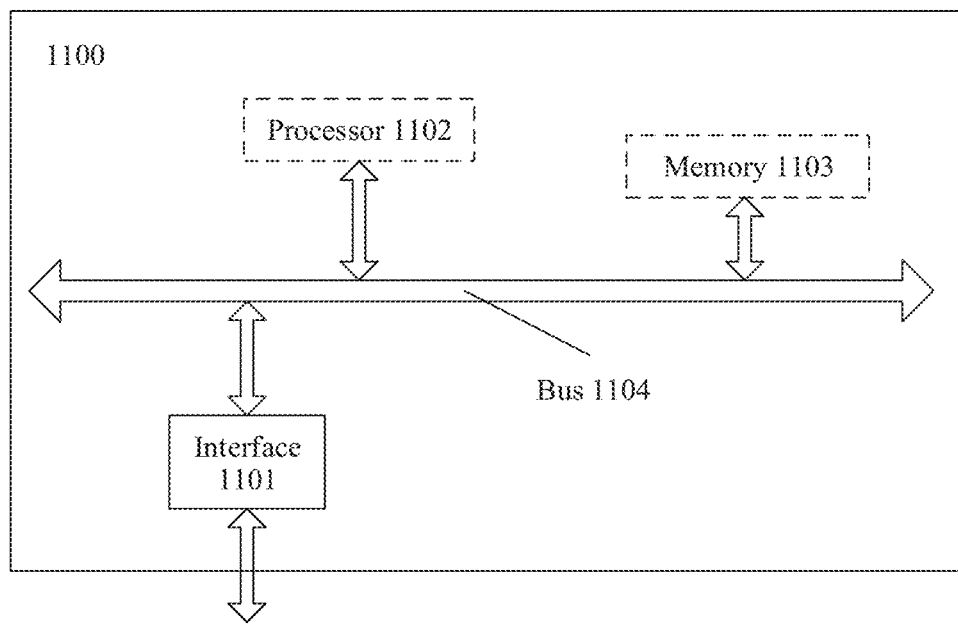
FIG. 11 is a schematic diagram of a hardware structure of another first device according to this application.

FIG. 11 is a schematic diagram of a hardware structure of a first device 1100 according to an embodiment of this application. The first device 1100 shown in FIG. 11 may perform corresponding steps performed by the first device in the methods in the foregoing embodiments. As shown in FIG. 11, the first device 1100 includes an interface 1101.

In an example, the interface 1101 includes a transmitter and a receiver, and is used by the first device to receive a packet from or send a packet to the management device in the foregoing embodiments or the second device in the foregoing embodiments. For example, the interface 1101 is configured to support step 302 in FIG. 3 and step 602 in FIG. 6.

In an example, the apparatus further includes a processor 1102, a memory 1103, and a bus 1104. The interface 1101, the processor 1102, and the memory 1103 are connected through the bus 1104. The processor 1102 is configured to perform processing performed by the first device in the foregoing embodiments, and/or is configured to perform another process of the technology described in this specification. For example, the processor 1102 is configured to encapsulate, into a packet, an obtained identifier of a second sub-interface, a correspondence between an identifier of a first sub-interface and a first network slice identifier, and information indicating that the first sub-interface is directly connected to the second sub-interface, and send the packet to the management device. Alternatively, the processor 1102 is configured to encapsulate, into a packet, an obtained correspondence between the identifier of the second sub-interface and a second network slice identifier, the correspondence between the identifier of the first sub-interface and the first network slice identifier, and the information indicating that the first sub-interface is directly connected to the second sub-interface, and send the packet to the management device. The memory 1103 may be configured to store a program, code, or an instruction. When executing the program, the code, or the instruction, the processor or a hardware device may complete a processing processes related to the first device in the method embodiments. Optionally, the memory 1103 may include a ROM and a RAM. The ROM includes a BIOS or an embedded system, and the RAM includes an application and an action system.

When the first device 1100 needs to run, a bootloader in the BIOS or the embedded system that is embedded into the ROM is used to boot a system to start, and boot the first device 1100 to enter a normal running state. After entering the normal running state, the first device 1100 runs the application program and the operating system in the RAM, to complete the processing processes related to the first device in the method embodiments. It may be understood that FIG. 11 shows only a simplified design of the first device 1100. In actual application, the first device may include any quantity of interfaces, processors, or memories. It should be understood that the processor may be a CPU, or may be another general purpose processor, a DSP, an ASIC, an FPGA or another programmable logic device, a discrete gate or transistor logic device, a discrete hardware component, or the like. The general purpose processor may be a microprocessor, any conventional processor, or the like. It should be noted that the processor may be a processor that supports an ARM architecture.

Further, in an optional embodiment, the memory may include a ROM and a RAM, and provide an instruction and data to the processor. The memory may further include a non-volatile RAM. For example, the memory may further store information about a device type. The memory may be a volatile memory or a non-volatile memory, or may include both a volatile memory and a non-volatile memory. The non-volatile memory may be a ROM, a PROM, an EPROM, an EEPROM, or a flash memory. The volatile memory may be a RAM and is used as an external cache. For example but not limitation, many forms of RAMs are available, for example, a static random access memory SRAM, a DRAM, an SDRAM, a DDR SDRAM, an ESDRAM, an SLDRAM, and a DR RAM.

It should be noted that any apparatus embodiment described above is merely an example. The units described as separate parts may or may not be physically separate, and parts displayed as units may or may not be physical units, may be located in one position, or may be distributed on a plurality of network units. Some or all the modules may be selected based on actual requirements to achieve the objectives of the solutions of the embodiments. In addition, in the accompanying drawings of the embodiments of the first device or the management device provided in this application, a connection relationship between the modules indicates that there is a communication connection between the modules, and the communication connection may be specifically implemented as one or more communications buses or signal cables. A person of ordinary skill in the art may understand and implement the embodiments of the present disclosure without creative efforts.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

Figure 12:
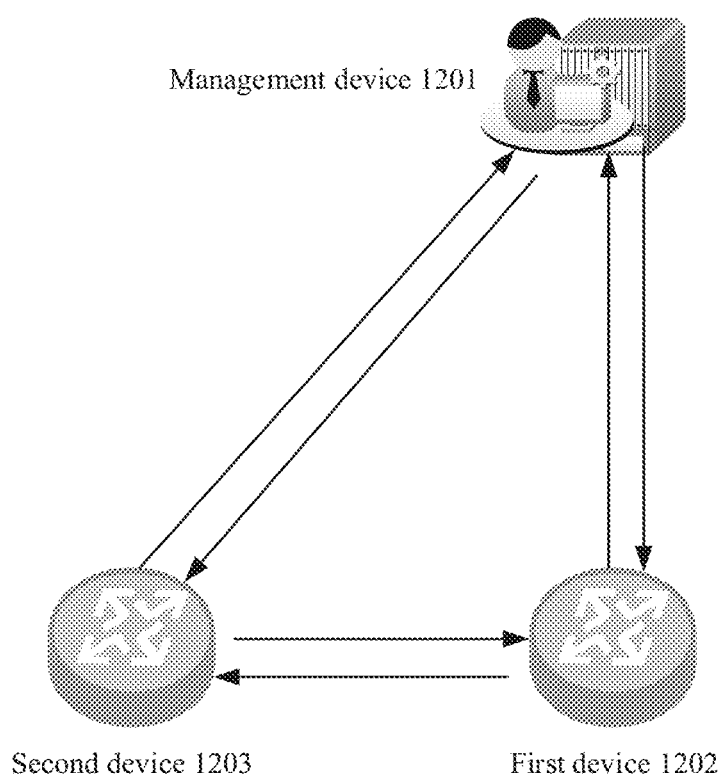
FIG. 12 is a schematic structural diagram of determining a network slice topology according to this application.

FIG. 12 is a schematic structural diagram of a system for determining a network slice topology according to this application. The system 1200 is configured to implement the method for determining a network slice topology in the foregoing method embodiments. The system includes a management device 1201 and a first device 1202. The management device may be configured to perform method steps of the management device in FIG. 2 and FIG. 5, to implement functions of the management device. The first device may be configured to perform method steps of the first device in FIG. 3 and FIG. 6, and method steps of the first device in FIG. 2 and FIG. 5, to implement functions of the first device.

In an example, the first device 1202 is configured to receive a correspondence, sent by a second device, between an identifier of a second sub-interface of the second device and a second network slice identifier, and send, to the management device, a correspondence between an identifier of a first sub-interface of the first device and a first network slice identifier, the correspondence between the identifier of the second sub-interface and the second network slice identifier, and information indicating that the first sub-interface is directly connected to the second sub-interface. The management device 1201 is configured to obtain the correspondence between the identifier of the first sub-interface and the first network slice identifier, the correspondence between the identifier of the second sub-interface and the second network slice, and the information indicating that the first sub-interface is directly connected to the second sub-interface, and determine at least one network slice topology based on the obtained information.

In an example, the system may further include a second device 1203. The first device 1202 is configured to receive the identifier, sent by the second device 1203, of the second sub-interface of the second device, and send, to the management device, the identifier of the second sub-interface, the correspondence between the identifier of the first sub-interface of the first device and the first network slice identifier, and the information indicating that the first sub-interface is directly connected to the second sub-interface. The management device 1201 is configured to obtain the following information sent by the first device: the correspondence between the identifier of the first sub-interface and the first network slice identifier, the correspondence between the identifier of the second sub-interface of the second device and the second network slice identifier, and the information indicating that the first sub-interface is directly connected to the second sub-interface. The management device 1201 determines the at least one network slice topology based on the sub-interface information. In an implementation, the correspondence between the identifier of the second sub-interface of the second device and the second network slice identifier is sent by the second device to the management device, and the second device and the first device are neighboring devices.

This application further provides a computer-readable storage medium. The storage medium stores at least one instruction, and the instruction is loaded and executed by a processor to implement any one of the foregoing methods for adjusting a service level. For example, corresponding method steps performed by a management device or a first device in the method embodiments of FIG. 2, FIG. 3, FIG. 5, or FIG. 6 may be performed.

This application provides a computer program. When the computer program is executed by a computer, a processor or a computer may perform corresponding method steps performed by a management device or a first device in the method embodiments of FIG. 2, FIG. 3, FIG. 5, or FIG. 6.

The methods or algorithm steps described in the content disclosed in the embodiments of this application may be implemented by hardware, or may be implemented by a processor by executing software instructions. The software instructions may include a corresponding software module. The software module may be stored in a RAM, a flash memory, a ROM, an EPROM, an EEPROM, a hard disk, a removable hard disk, an optical disc, or any other form of storage medium well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in a core network interface device. Certainly, the processor and the storage medium may alternatively exist in the core network interface device as discrete components.

A person skilled in the art should be aware that in the foregoing one or more examples, functions described in this application may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communications medium. The communications medium includes any medium that enables a computer program to be transmitted from one place to another. The storage medium may be any available medium accessible to a general-purpose or special-purpose computer.

The objectives, technical solutions, and beneficial effects of this application are further described in detail in the foregoing specific embodiments. It should be understood that the foregoing description is merely specific embodiments of this application, but are not intended to limit the protection scope of this application. Any modification, equivalent replacement, improvement, or the like made based on the technical solutions of this application shall fall within the protection scope of this application.

What is claimed is:

1. A method implemented by a management device, wherein the method comprises:
   obtaining sub-interface information comprising a first correspondence between a first identifier of a first sub-interface of a first device and a first network slice identifier, a second correspondence between a second identifier of a second sub-interface of a second device and a second network slice identifier, and first information indicating that the first sub-interface is directly coupled to the second sub-interface; and
   determining a network slice topology based on the sub-interface information.

2. The method of claim 1, wherein the first network slice identifier is the same as the second network slice identifier, and wherein the network slice topology comprises a first network slice topology comprising:
   the first identifier;
   the second identifier; and
   a third identifier of a direct link between the first sub-interface and the second sub-interface.

3. The method of claim 1, wherein the first network slice identifier is different from the second network slice identifier, and wherein the network slice topology comprises:
   a second network slice topology comprising the first identifier; and
   a third network slice topology comprising the second identifier.

4. The method of claim 1, wherein the sub-interface information further comprises:
   a fourth identifier of the first device; and
   a fifth identifier of the second device.

5. The method of claim 4, wherein the first network slice identifier is the same as the second network slice identifier, and wherein the network slice topology comprises a fourth network slice topology comprising:
   the first identifier;
   the fourth identifier;
   the second identifier;
   the fifth identifier; and
   a third identifier of a direct link between the first sub-interface and the second sub-interface.

6. The method of claim 4, wherein the first network slice identifier is different from the second network slice identifier, and wherein the network slice topology comprises:
   a fifth network slice topology comprising the first identifier and the fourth identifier; and
   a sixth network slice topology comprising the second identifier and the fifth identifier.

7. The method of claim 1, further comprising:
   receiving, from the first device, a first packet comprising first update information of the sub-interface information; and
   updating the network slice topology based on the first update information.

8. The method of claim 7, wherein the first update information comprises second update information of the second correspondence.

9. The method of claim 1, further comprising determining, based on a third correspondence between the first network slice identifier and a service-level agreement (SLA) parameter, that the first sub-interface transmits a service flow based on the SLA parameter.

10. The method of claim 1, wherein before obtaining the sub-interface information, the method further comprises sending, to the first device, a second packet indicating that the first device is to send a piece of information in the sub-interface information to the management device.

11. The method of claim 1, wherein before obtaining the sub-interface information, the method further comprises:
    receiving, from the first device, a third packet comprising the first correspondence and the second correspondence; and
    obtaining, from the third packet, the first correspondence and the second correspondence.

12. The method of claim 1, wherein before obtaining the sub-interface information, the method further comprises:
    receiving, from the first device, a fourth packet comprising the first correspondence;

receiving, from the second device, a fifth packet comprising the second correspondence;
obtaining, from the fourth packet, the first correspondence; and
obtaining, from the fifth packet, the second correspondence.

13. The method of claim 2, wherein the sub-interface information further comprises a fourth correspondence between a sixth identifier of a physical port and the first network slice identifier, wherein the physical port comprises the first sub-interface, and wherein the first network slice topology further comprises the sixth identifier.

14. A management device, comprising:
a memory configured to store instructions; and
a processor coupled to the memory, wherein the instructions cause the processor to be configured to:
obtain sub-interface information comprising a first correspondence between a first identifier of a first sub-interface of a first device and a first network slice identifier, a second correspondence between a second identifier of a second sub-interface of a second device and a second network slice identifier, and first information indicating that the first sub-interface is directly coupled to the second sub-interface; and
determine a network slice topology based on the sub-interface information.

15. The management device of claim 14, wherein the first network slice identifier is the same as the second network slice identifier, and wherein the network slice topology comprises a first network slice topology comprising:
the first identifier;
the second identifier; and
a third identifier of a direct link between the first sub-interface and the second sub-interface.

16. The management device of claim 14, wherein the first network slice identifier is different from the second network slice identifier, and wherein the network slice topology comprises:
a second network slice topology comprising the first identifier; and
a third network slice topology comprising the second identifier.

17. The management device of claim 14, wherein the sub-interface information further comprises:
a fourth identifier of the first device; and
a fifth identifier of the second device.

18. The management device of claim 17, wherein the first network slice identifier is the same as the second network slice identifier, and wherein the network slice topology comprises a fourth network slice topology comprising:
the first identifier;
the fourth identifier;
the second identifier;
the fifth identifier; and
a third identifier of a direct link between the first sub-interface and the second sub-interface.

19. The management device of claim 17, wherein the first network slice identifier is different from the second network slice identifier, and wherein the network slice topology comprises:
a fifth network slice topology comprising the first identifier and the fourth identifier; and
a sixth network slice topology comprising the second identifier and the fifth identifier.

20. The management device of claim 14, wherein before obtaining the sub-interface information, the instructions further cause the processor to be configured to send, to the first device, a first packet indicating the first device to send a piece of information in the sub-interface information to the management device.

21. The management device of claim 14, wherein the instructions further cause the processor to be configured to:
receive, from the first device, a second packet comprising first update information of the sub-interface information; and
update the network slice topology based on the first update information.

22. The management device of claim 21, wherein the first update information comprises second update information of the second correspondence.

23. The management device of claim 14, wherein the instructions further cause the processor to be configured to:
receive, from the first device, a fourth packet comprising the first correspondence and the second correspondence; and
obtain, from the fourth packet, the first correspondence and the second correspondence.

24. The management device of claim 14, wherein the instructions further cause the processor to be configured to:
receive, from the first device, a fifth packet comprising the first correspondence;
receive, from the second device, a sixth packet comprising the second correspondence;
obtain, from the fifth packet, the first correspondence; and
obtain, from the sixth packet, the second correspondence.

25. The management device of claim 24, wherein the sub-interface information further comprises a third correspondence between a sixth identifier of a physical port and the first network slice identifier, wherein the physical port comprises the first sub-interface, and wherein the network slice topology further comprises the sixth identifier.

26. A first device, comprising:
a memory configured to store instructions; and
a processor coupled to the memory, wherein the instructions cause the processor to be configured to:
receive, from a second device, a first packet comprising a second identifier of a second sub-interface of the second device; and
send sub-interface information to a management device,
wherein the sub-interface information comprises the second identifier, a first correspondence between a first identifier of a first sub-interface of the first device and a first network slice identifier, and information indicating that the first sub-interface is directly coupled to the second sub-interface.

27. The first device of claim 26, wherein the first packet further comprises a second correspondence between the second identifier and a second network slice identifier, and wherein the sub-interface information further comprises the second correspondence.

28. The first device of claim 26, wherein before sending the first packet to the management device, the instructions further cause the processor to be configured to execute the instructions to receive, from the management device, a second packet indicating the first device to send a piece of information in the sub-interface information to the management device.

29. The first device of claim 26, wherein the instructions further cause the processor to be configured to send, to the management device, a third packet comprising first update information of the sub-interface information.

30. The first device of claim 29, wherein the first update information comprises second update information of a second correspondence between the second identifier and a second network slice identifier.

31. The first device of claim 26, wherein the instructions further cause the processor to be configured to determine, based on a third correspondence between the first network slice identifier and a service-level agreement (SLA) parameter, that the first sub-interface transmits a service flow based on the SLA parameter.

* * * * *